US012731184B2

(12) United States Patent
Shannon et al.

(10) Patent No.: US 12,731,184 B2
(45) Date of Patent: Sep. 8, 2026

(54) SYSTEM AND METHOD FOR DUAL REMOTE AUTHENTICATION OF DIGITAL ASSISTED SHOPPING AGENTS AND CUSTOMERS USING PROXIMITY-BASED MOBILE DEVICE INTERACTIONS, ENTERPRISE SECURITY, AND BIOMETRICS

(71) Applicant: Bank of America Corporation, Charlotte, NC (US)

(72) Inventors: Stephen T. Shannon, Charlotte, NC (US); Elvin Crabbe, Waxhaw, NC (US); Penelope M. York, Rockland, ME (US); Marlana Elizabeth Bosley, Belmont, NC (US); Neena Shah, Westlake Village, CA (US); Radhakrishna Kannuswamy, Irving, TX (US)

(73) Assignee: Bank of America Corporation, Charlotte, NC (US)

( * ) Notice: Subject to any disclaimer, the term of this patent is extended or adjusted under 35 U.S.C. 154(b) by 69 days.

(21) Appl. No.: 18/804,307

(22) Filed: Aug. 14, 2024

(65) Prior Publication Data

US 2026/0050898 A1 Feb. 19, 2026

(51) Int. Cl.

*G06Q 40/02* (2023.01)
*G06F 21/32* (2013.01)

(Continued)

(52) U.S. Cl.

CPC ........... *G06Q 40/022* (2025.08); *G06F 21/32* (2013.01); *G06F 21/602* (2013.01); (Continued)

(58) Field of Classification Search

CPC ........ G06Q 30/01–016; G06Q 30/0613–0619; G06F 21/32; G06F 21/602–606

See application file for complete search history.

(56) References Cited

U.S. PATENT DOCUMENTS 7,216,803 B2 5/2007 Nwosu
7,258,272 B2 * 8/2007 Yoshizane .............. G06F 21/32 235/380

(Continued)

FOREIGN PATENT DOCUMENTS

CN 104202486 A 12/2014
CN 111325053 A 6/2020

(Continued)

*Primary Examiner* — Jay Huang

(74) *Attorney, Agent, or Firm* — Banner & Witcoff, Ltd.

(57) ABSTRACT

Systems and methods are disclosed for dual, simultaneous, single-session, proximity-based, secure authentication of a Digital Assisted Shopping (DAS) representative and a customer in an unsecured remote location. The method includes installing a mobile banking application on the customer's device and an enterprise application on the DAS representative's device, both with biometric verification. Proximity detection using Bluetooth Low Energy (BLE) initiates a secure session via push notifications. A secure communication channel is established through a secure local handshake, involving encryption key exchange and mutual authentication. The system exchanges data related to customer profiles and financial accounts, continuously monitors geolocation using GPS, Wi-Fi, and cellular data, and performs periodic background biometric re-verifications. AI/ML algorithms analyze customer data to propose financial products and services, which are securely shared with the customer for review and selection. The system facilitates real-time enrollment and transaction processing, terminating the session upon detecting security breaches.

20 Claims, 5 Drawing Sheets

(51) Int. Cl.

| | |
|---|---|
| ***G06F 21/60*** | (2013.01) |
| ***G06Q 20/10*** | (2012.01) |
| ***G06Q 20/32*** | (2012.01) |
| ***G06Q 20/38*** | (2012.01) |

(52) U.S. Cl.

CPC ......... *G06Q 20/108* (2013.01); *G06Q 20/327* (2013.01); *G06Q 20/3823* (2013.01)

(56) References Cited

U.S. PATENT DOCUMENTS

| | | | |
|---|---|---|---|
| 8,392,965 B2 | 3/2013 | Carter et al. | |
| 8,952,781 B2 | 2/2015 | Al-Azem et al. | |
| 10,529,015 B1 * | 1/2020 | Hill | G06Q 20/4014 |
| 10,810,816 B1 | 10/2020 | Kocher et al. | |
| 11,468,506 B1 * | 10/2022 | Osterkamp | G06Q 40/02 |
| 2006/0293892 A1 | 12/2006 | Pathuel | |
| 2009/0028444 A1 | 1/2009 | Hwang et al. | |
| 2013/0013498 A1 * | 1/2013 | Fisher | G06Q 20/401 705/40 |
| 2014/0195426 A1 * | 7/2014 | Caldwell | G06Q 20/3223 705/42 |
| 2014/0207672 A1 * | 7/2014 | Kelley | G06Q 20/3223 705/42 |
| 2017/0154340 A1 * | 6/2017 | Ballepu | G06Q 10/063112 |
| 2017/0242995 A1 * | 8/2017 | Bassenye-Mukasa | G06F 16/24575 |
| 2018/0089654 A1 * | 3/2018 | Licht | G06Q 20/18 |
| 2018/0191903 A1 * | 7/2018 | Yokel | H04M 3/5232 |
| 2018/0232791 A1 * | 8/2018 | Shah | G06N 3/006 |
| 2019/0392491 A1 * | 12/2019 | Niemann | G06Q 50/02 |
| 2021/0397687 A1 * | 12/2021 | Adjaz | G06F 21/36 |
| 2023/0117012 A1 * | 4/2023 | Gupta | G06N 20/00 705/7.31 |
| 2023/0298455 A1 * | 9/2023 | Willis | H04W 4/023 |
| 2024/0289789 A1 * | 8/2024 | Matsuda | G06Q 30/0202 |

FOREIGN PATENT DOCUMENTS

| | | |
|---|---|---|
| CN | 111818033 A | 10/2020 |
| CN | 212933546 U | 4/2021 |
| CN | 110169032 B | 10/2023 |
| JP | 2008075424 A | 4/2008 |
| KR | 100722873 B1 | 5/2007 |
| KR | 20160006126 A | 1/2016 |
| KR | 20160040037 A | 4/2016 |
| KR | 101622154 B1 | 5/2016 |
| KR | 20170040913 A | 4/2017 |
| WO | 2005122462 A1 | 12/2005 |
| WO | 2006014205 B1 | 1/2007 |

* cited by examiner

SYSTEM AND METHOD FOR DUAL REMOTE AUTHENTICATION OF DIGITAL ASSISTED SHOPPING AGENTS AND CUSTOMERS USING PROXIMITY-BASED MOBILE DEVICE INTERACTIONS, ENTERPRISE SECURITY, AND BIOMETRICS

TECHNICAL FIELD

The invention pertains to information security systems and methods, specifically focused on the secure authentication and interaction of mobile devices in remote environments. This invention involves the use of proximity-based mobile device interaction, dynamic authentication protocols, and secure document exchange to ensure the integrity and confidentiality of user interactions. The system leverages microservices to perform geolocation verification, multi-layer authentication, and communication between customer and associate devices to prevent unauthorized access and ensure secure transactions.

DESCRIPTION OF THE RELATED ART

In modern banking and retail industries, the process of authenticating customers has traditionally required their physical presence at a specific location, such as a bank branch or retail store. This requirement poses significant inconvenience for customers who cannot visit these locations due to being at remote sites like sports events, college campuses, or rural areas. The necessity to travel for authentication disrupts the customer experience and reduces the efficiency of service delivery, often leading to frustration and dissatisfaction among customers who expect seamless and convenient interactions with service providers.

The current systems for customer authentication are heavily reliant on in-person verification methods such as chip and pin, which are not only location-bound but also time-consuming. These methods necessitate that customers and associates be in the same place, creating logistical challenges, especially in situations where remote service is needed. This reliance on physical presence limits the ability of service providers to extend their reach and offer personalized services to customers who are not able to visit a physical location due to various constraints.

Additionally, traditional authentication processes often involve handling physical documents, which can be cumbersome and prone to errors. The manual nature of these processes slows down the overall service delivery and increases the potential for mistakes, which can further degrade the customer experience. Customers seeking services such as opening new accounts or applying for loans are particularly affected, as these processes require extensive documentation and verification, often necessitating multiple visits to a physical location.

Another significant challenge is the security risk associated with remote transactions. As more customers demand remote services, the need for secure authentication methods that can be executed without compromising sensitive information becomes paramount. Existing systems are not adequately equipped to handle the complexities of remote authentication, making them vulnerable to fraud and unauthorized access. This gap in security measures undermines customer trust and poses a substantial risk to service providers.

The problem is further compounded by the slow, paper-based processes that new customers often have to endure. When a customer visits a service provider for the first time, the associate typically goes through a lengthy procedure involving filling out forms and manually verifying documents. This approach is not only inefficient but also creates a barrier for new customers, who may find the process daunting and time-consuming. The need for a faster, more efficient way to onboard new customers is evident.

Moreover, the increasing mobility of customers means that service providers must adapt to a more dynamic environment where customers expect to receive services on the go. Whether at a sporting event, on a college campus, or traveling in rural areas, customers want the flexibility to interact with service providers without being tied to a specific location. The current systems do not support this level of mobility, thereby restricting the ability of service providers to meet customer expectations and deliver timely services.

There is also the issue of resource allocation for service providers. The need to have dedicated physical locations for customer authentication requires significant investment in infrastructure and personnel. This setup not only increases operational costs but also limits the scalability of services. Service providers are unable to efficiently deploy resources to areas with high customer demand, resulting in suboptimal service delivery and missed opportunities for growth.

In addition to these logistical and operational challenges, the existing systems do not provide a streamlined way to handle high-value transactions securely. Transactions involving large sums of money require stringent security measures to prevent fraud and ensure the integrity of the transaction. Traditional methods fall short in providing the necessary security protocols for remote high-value transactions, making it difficult for service providers to offer such services without significant risk.

The problem is also evident in the realm of digital transactions, where customers expect a seamless experience. The inability to authenticate customers remotely and securely hampers the adoption of digital services, limiting the potential for growth in this area. Customers are increasingly looking for digital solutions that allow them to interact with service providers from anywhere, and the lack of robust remote authentication methods is a significant barrier to this transition.

Finally, the challenge of ensuring the privacy and confidentiality of customer data during remote interactions cannot be overstated. The handling of sensitive information requires secure channels of communication and robust authentication protocols to prevent unauthorized access and data breaches. Existing systems do not adequately address these concerns, leading to potential risks that can have severe implications for both customers and service providers.

The long felt and unmet need for this invention arises from the combination of these challenges. Customers require a flexible, secure, and efficient way to authenticate themselves and interact with service providers remotely. The current systems fail to provide a comprehensive solution that addresses the need for mobility, security, efficiency, and convenience. This invention is designed to bridge these gaps, offering a robust framework for remote authentication and interaction that meets the evolving demands of customers and service providers alike.

SUMMARY OF THE INVENTION

The invention pertains to an advanced information security system designed for dual, simultaneous, single-session, proximity-based, secure authentication between a Digital Assisted Shopping (DAS) representative using an enterprise mobile device and a customer using a non-enterprise mobile device in unsecured remote locations. This system ensures that both parties can securely interact and perform financial transactions without needing to be in a traditional banking environment. This invention addresses the growing need for remote banking services, enabling secure, efficient, and seamless interactions between bank representatives and customers.

At the core of this invention is the secure installation of specialized applications on both the customer's and the DAS representative's mobile devices. The customer's non-enterprise mobile device hosts a mobile banking application embedded with security microservices designed for biometric identity verification. The DAS representative's enterprise mobile device runs an enterprise application with similar biometric identity verification capabilities. These applications are integral in establishing a secure authentication framework that relies heavily on biometric data to verify the identities of both the customer and the representative, ensuring that unauthorized access is prevented.

The authentication process begins with capturing biometric data on both devices. The customer's biometric data is captured through the mobile banking application, while the DAS representative's biometric data is captured through the enterprise application. This data is then compared against pre-stored biometric records to verify identities. This step is crucial in ensuring that both parties are who they claim to be, thus establishing a secure foundation for the subsequent transactions and communications.

Proximity detection using Bluetooth Low Energy (BLE) technology may be employed to ensure that the customer's and the DAS representative's devices are within a predefined range. This proximity detection is essential in preventing remote attacks and ensuring that both parties are in close physical proximity to each other. Upon confirming proximity, the system initiates a secure session through a push notification sent from the enterprise mobile device to the non-enterprise mobile device. The customer acknowledges this notification, which confirms the initiation of the digital assisted shopping session.

A secure local handshake is then established between the two applications. This handshake involves exchanging encryption keys using asymmetric encryption methods and generating a shared session key, such as using the Diffie-Hellman key exchange protocol. Mutual authentication is performed using digital certificates or pre-shared keys, creating a robust security layer that protects the integrity and confidentiality of the communication channel. This step ensures that any data exchanged during the session is encrypted and secure from potential eavesdroppers.

Once the secure communication channel is established, data related to customer profiles, financial accounts, products, and services can be exchanged between the devices. The system retrieves customer profiles and financial account information from a Customer Relationship Management (CRM) system to the enterprise application. Push notifications are sent to the mobile banking application prompting the customer to review and approve or update their profile. Artificial intelligence (AI) and machine learning (ML) algorithms are utilized to analyze the customer's profile, transaction history, and financial goals to identify suitable financial accounts, products, and services for the customer. It also provides security investigation and identify verification to prevent fraud.

The system also incorporates continuous geolocation monitoring using GPS, Wi-Fi, and cellular data to track the locations of both devices. This geolocation monitoring ensures that both the customer and the DAS representative remain within a safe and predefined proximity range. Real-time alerts are sent if the devices move out of the required range or enter a prohibited area, thereby maintaining the security of the session. Periodic background biometric re-verifications are performed seamlessly without disturbing the users, ensuring that the authenticated users remain present throughout the session.

A significant feature of the invention is the digital assistant shopping process, which proposes financial accounts, products, and services to the customer. This process involves analyzing the customer's profile and financial data using AI or ML algorithms, generating a list of recommended financial products and services based on the analysis. The generated list is securely shared with the customer through the mobile banking application, allowing the customer to review and select desired products and services. Detailed information and options for each recommended product and service are provided through secure screen sharing from the enterprise application to the mobile banking application.

The system facilitates the customer's selections by enabling secure, real-time enrollment and transaction processing through the secure communication channel. This real-time processing ensures that the customer can quickly and efficiently enroll in new financial products and services, complete transactions, and receive immediate confirmations. This feature significantly enhances the customer experience by providing quick access to banking services without the need for physical branch visits.

In the event of any security breaches or anomalies, which may be detected or predicted by AI or ML or classical methods, the system includes a session termination module that promptly ends the session. This module logs the event and alerts both the customer and the DAS representative, detailing the reason for the termination. This proactive approach ensures that any potential threats are swiftly addressed, maintaining the overall security and integrity of the system. The system's ability to detect and respond to security breaches in real-time underscores its robustness and reliability.

In conclusion, this invention provides a comprehensive solution for secure, remote interactions between bank representatives and customers. By leveraging advanced biometric verification, proximity detection, secure communication protocols, and AI-driven recommendations, the system ensures a high level of security and efficiency. This invention is particularly relevant in today's context, where remote banking services are increasingly in demand. The ability to securely conduct financial transactions from remote locations without compromising security makes this system a valuable tool for modern banking.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, an information security method for dual, simultaneous, single-session, proximity-based, secure authentication of a Digital Assisted Shopping (DAS) representative using an enterprise mobile device and a customer using a non-enterprise mobile device in an unsecured remote location comprises the steps of securely installing a mobile banking application on the non-enterprise mobile device of the customer, the mobile banking application including embedded security microservices for biometric identity verification; performing biometric identity verification of the customer on the non-enterprise mobile device using the mobile banking application; securely installing an enterprise application on the enterprise mobile device of the DAS representative, the enterprise application including biometric identity verification capabilities; performing biometric identity verification of the DAS representative on the enterprise mobile device using the enterprise application; automatically detecting the proximity of the non-enterprise mobile device and the enterprise mobile device when within a predefined Bluetooth proximity range; sending a push notification from the enterprise mobile device to the non-enterprise mobile device to initiate a digital assisted shopping session; receiving an acknowledgment of the push notification from the non-enterprise mobile device, confirming the initiation of the digital assisted shopping session; establishing a secure local handshake between the mobile banking application on the non-enterprise mobile device and the enterprise application on the enterprise mobile device by exchanging encryption keys and performing mutual authentication; establishing a local wireless encrypted communication channel between the mobile banking application and the enterprise application using the encryption keys; retrieving a customer profile and existing financial accounts, products, and services from a Customer Relationship Management (CRM) system to the enterprise application; sending a push notification from the CRM system to the mobile banking application prompting the customer to review and approve or update the customer profile; utilizing artificial intelligence (AI) or machine learning (ML) algorithms to analyze the customer profile, transaction history, and financial goals to identify suitable financial accounts, products, and services for the customer; securely sharing a screen from the enterprise application to the mobile banking application to provide information regarding available financial accounts, products, and services; receiving selections of desired financial accounts, products, and services from the customer via the mobile banking application; performing enhanced verifications if the selected financial accounts, products, and services require additional security; communicating over a secure cloud connection between the enterprise application and a central banking system to facilitate enrollment in the desired financial accounts, products, and services; wirelessly communicating locally between the non-enterprise mobile device and the enterprise mobile device to exchange enrollment materials and applications for the desired financial accounts, products, and services; electronically accepting terms and conditions for the desired financial accounts, products, and services on the non-enterprise mobile device; opening the desired accounts, providing the selected products, or initiating the selected services in response to the electronic acceptance; reporting the opening of accounts, provision of products, or initiation of services to the central banking system; continuously monitoring the geolocation of both the enterprise mobile device and the non-enterprise mobile device to confirm proximity and verify that the DAS representative and the customer are not in a prohibited or dangerous location; performing periodic background biometric verification of both the customer and the DAS representative during the session without disturbing them; and terminating the session if any security breaches, failed verifications, or prohibited locations are detected during the session.

In some arrangements, the method wherein the step of performing biometric identity verification of the customer on the non-enterprise mobile device further comprises capturing biometric data using the mobile banking application's embedded security microservices and comparing the captured biometric data to pre-stored biometric data for the customer to confirm the customer's identity.

In some arrangements, the method wherein the step of performing biometric identity verification of the DAS representative on the enterprise mobile device further comprises capturing biometric data using the enterprise application's biometric identity verification capabilities and comparing the captured biometric data to pre-stored biometric data for the DAS representative to confirm the representative's identity.

In some arrangements, the method wherein the step of automatically detecting the proximity of the non-enterprise mobile device and the enterprise mobile device further comprises utilizing Bluetooth Low Energy (BLE) technology to detect when the devices are within the predefined proximity range and establishing an initial connection based on the detected proximity.

In some arrangements, the method wherein the step of establishing a secure local handshake further comprises using asymmetric encryption to exchange public keys between the non-enterprise mobile device and the enterprise mobile device, generating a shared session key using a Diffie-Hellman key exchange protocol, and performing mutual authentication using digital certificates or pre-shared keys.

In some arrangements, the method wherein the step of establishing a local wireless encrypted communication channel further comprises using Transport Layer Security (TLS) or Secure Socket Layer (SSL) protocols to encrypt data transmitted between the mobile banking application and the enterprise application and utilizing Wi-Fi Direct or Near Field Communication (NFC) for direct device-to-device connections.

In some arrangements, the method wherein the step of performing enhanced verifications further comprises requiring additional biometric checks for high-value transactions and implementing multi-factor authentication (MFA) using one-time passwords (OTPs) or security questions for critical actions.

In some arrangements, the method wherein the step of continuous monitoring of geolocation further comprises using GPS, Wi-Fi, and cellular data to track the locations of the enterprise mobile device and the non-enterprise mobile device and sending real-time alerts if the devices move out of the required proximity range or enter a prohibited area.

In some arrangements, the method wherein the step of performing periodic background biometric verification further comprises integrating non-intrusive biometric checks seamlessly into the mobile banking application's operation to verify the authorized user's identity without disturbing the session and terminating the session if any discrepancies or failed verifications are detected during the session.

In some arrangements, an information security system for dual, simultaneous, single-session, proximity-based, secure authentication of a Digital Assisted Shopping (DAS) representative using an enterprise mobile device and a customer using a non-enterprise mobile device in an unsecured remote location comprises a mobile banking application installed on the non-enterprise mobile device of the customer, the mobile banking application including embedded security microservices for biometric identity verification; an enterprise application installed on the enterprise mobile device of the DAS representative, the enterprise application including biometric identity verification capabilities; a Bluetooth proximity detection module configured to detect the proximity of the non-enterprise mobile device and the enterprise mobile device when within a predefined Bluetooth proximity range; a push notification module configured to send a push notification from the enterprise mobile device to the non-enterprise mobile device to initiate a digital assisted shopping session; a secure local handshake module configured to establish a secure local handshake between the mobile banking application on the non-enterprise mobile device and the enterprise application on the enterprise mobile device by exchanging encryption keys and performing mutual authentication; a local wireless encrypted communication module configured to establish a local wireless encrypted communication channel between the mobile banking application and the enterprise application using the encryption keys; a Customer Relationship Management (CRM) integration module configured to retrieve a customer profile and existing financial accounts, products, and services from a CRM system to the enterprise application; an artificial intelligence (AI) and machine learning (ML) module configured to analyze the customer profile, transaction history, and financial goals to identify suitable financial accounts, products, and services for the customer; a secure screen sharing module configured to securely share a screen from the enterprise application to the mobile banking application to provide information regarding available financial accounts, products, and services; an enhanced verification module configured to perform enhanced verifications if the selected financial accounts, products, and services require additional security; a secure cloud communication module configured to facilitate communication over a secure cloud connection between the enterprise application and a central banking system to facilitate enrollment in the desired financial accounts, products, and services; a geolocation monitoring module configured to continuously monitor the geolocation of both the enterprise mobile device and the non-enterprise mobile device to confirm proximity and verify that the DAS representative and the customer are not in a prohibited or dangerous location; a background biometric verification module configured to perform periodic background biometric verification of both the customer and the DAS representative during the session without disturbing them; and a session termination module configured to terminate the session if any security breaches, failed verifications, or prohibited locations are detected during the session.

In some arrangements, the system wherein the mobile banking application further comprises a biometric data capture module configured to capture biometric data using the mobile banking application's embedded security microservices and a biometric data comparison module configured to compare the captured biometric data to pre-stored biometric data for the customer to confirm the customer's identity.

In some arrangements, the system wherein the enterprise application further comprises a biometric data capture module configured to capture biometric data using the enterprise application's biometric identity verification capabilities and a biometric data comparison module configured to compare the captured biometric data to pre-stored biometric data for the DAS representative to confirm the representative's identity.

In some arrangements, the system wherein the Bluetooth proximity detection module is configured to utilize Bluetooth Low Energy (BLE) technology to detect when the non-enterprise mobile device and the enterprise mobile device are within the predefined proximity range and establish an initial connection based on the detected proximity.

In some arrangements, the system wherein the secure local handshake module is configured to use asymmetric encryption to exchange public keys between the non-enterprise mobile device and the enterprise mobile device, generate a shared session key using a Diffie-Hellman key exchange protocol, and perform mutual authentication using digital certificates or pre-shared keys.

In some arrangements, the system wherein the local wireless encrypted communication module is configured to use Transport Layer Security (TLS) or Secure Socket Layer (SSL) protocols to encrypt data transmitted between the mobile banking application and the enterprise application and utilize Wi-Fi Direct or Near Field Communication (NFC) for direct device-to-device connections.

In some arrangements, the system wherein the enhanced verification module is configured to require additional biometric checks for high-value transactions and implement multi-factor authentication (MFA) using one-time passwords (OTPs) or security questions for critical actions.

In some arrangements, the system wherein the geolocation monitoring module is configured to use GPS, Wi-Fi, and cellular data to track the locations of the enterprise mobile device and the non-enterprise mobile device and send real-time alerts if the devices move out of the required proximity range or enter a prohibited area.

In some arrangements, the system wherein the background biometric verification module is configured to integrate non-intrusive biometric checks seamlessly into the mobile banking application's operation to verify the authorized user's identity without disturbing the session and terminate the session if any discrepancies or failed verifications are detected during the session.

In some arrangements, the system wherein the secure screen sharing module is configured to securely share the DAS representative's screen with the customer's mobile banking application to provide detailed information about available financial products and services and ensure that sensitive financial information is only visible to the intended recipient during the screen sharing session.

In some arrangements, an information security method for secure authentication and communication between a Digital Assisted Shopping (DAS) representative using an enterprise mobile device and a customer using a non-enterprise mobile device comprises the steps of performing biometric identity verification on the non-enterprise mobile device of the customer, wherein the biometric identity verification includes capturing biometric data using the mobile banking application and comparing the captured biometric data to pre-stored biometric data for the customer; performing biometric identity verification on the enterprise mobile device of the DAS representative, wherein the biometric identity verification includes capturing biometric data using the enterprise application and comparing the captured biometric data to pre-stored biometric data for the DAS representative; automatically detecting the proximity of the non-enterprise mobile device and the enterprise mobile device using Bluetooth Low Energy (BLE) technology, wherein proximity is detected when the devices are within a predefined proximity range; initiating a secure session between the non-enterprise mobile device and the enterprise mobile device upon detecting the proximity, wherein the initiation includes sending a push notification from the enterprise mobile device to the non-enterprise mobile device to initiate a digital assisted shopping session and receiving an acknowledgment of the push notification from the non-enterprise mobile device; establishing a secure communication channel between the non-enterprise mobile device and the enterprise mobile device, wherein the secure communication channel is established by performing a secure local handshake that includes exchanging encryption keys using asymmetric encryption, generating a shared session key using a Diffie-Hellman key exchange protocol, and performing mutual authentication using digital certificates or pre-shared keys; exchanging data related to customer profiles, financial accounts, products, and services between the non-enterprise mobile device and the enterprise mobile device through the secure communication channel, wherein the data exchange includes retrieving customer profiles and financial account information from a Customer Relationship Management (CRM) system to the enterprise application, sending push notifications to the mobile banking application for profile review and updates, and utilizing artificial intelligence (AI) or machine learning (ML) algorithms to analyze the customer profile, transaction history, and financial goals to identify suitable financial accounts, products, and services for the customer; continuously monitoring the geolocation of both the enterprise mobile device and the non-enterprise mobile device to ensure proximity and safety, wherein the geolocation monitoring uses GPS, Wi-Fi, and cellular data to track the locations of the devices and sends real-time alerts if the devices move out of the required proximity range or enter a prohibited area; performing periodic biometric re-verifications of both the customer and the DAS representative during the session, wherein the biometric re-verifications are performed in the background without disturbing the users and are integrated seamlessly into the mobile banking application's and enterprise application's operation; proposing financial accounts, products, and services to the customer through a digital assistant shopping process, wherein the process includes analyzing the customer's profile, transaction history, and financial goals using AI or ML algorithms, generating a list of recommended financial accounts, products, and services based on the analysis, securely sharing the generated list with the customer via the mobile banking application, allowing the customer to review and select desired financial accounts, products, and services through the mobile banking application, providing detailed information and options for each recommended financial account, product, and service through secure screen sharing from the enterprise application to the mobile banking application, facilitating the customer's selections by enabling secure, real-time enrollment and transaction processing through the secure communication channel, and terminating the session if any security breaches or anomalies are detected, wherein session termination includes logging the event and alerting both the customer and the DAS representative of the termination and the reason for it.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

DETAILED DESCRIPTION

Figure 1:
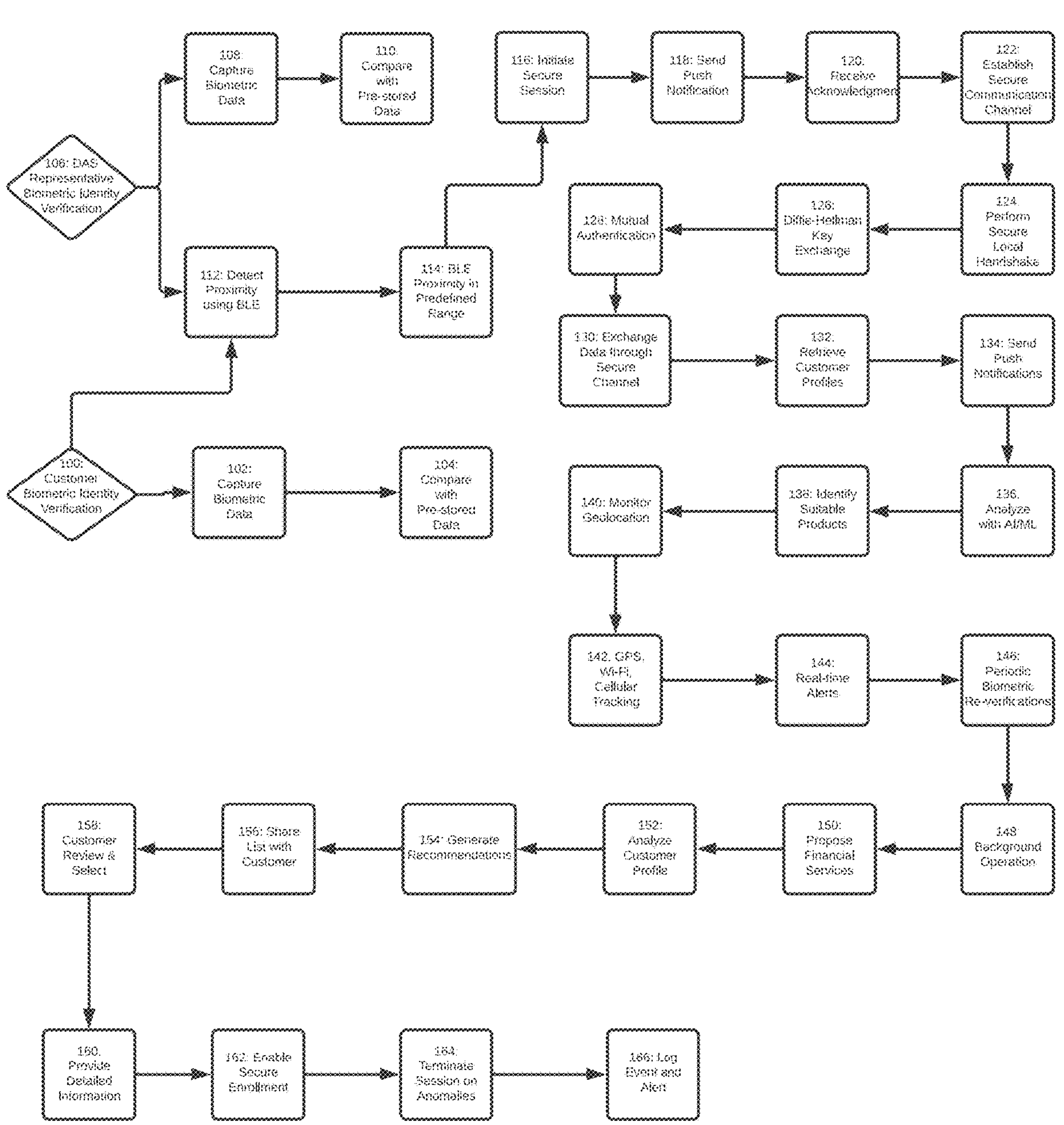
FIG. 1 illustrates a comprehensive flow diagram detailing the process of dual, simultaneous, single-session, proximity-based secure authentication between a DAS representative and a customer. The process encompasses steps such as biometric identity verification, proximity detection, secure session initiation, encrypted communication, customer profile retrieval and analysis, proposal and selection of financial services, enhanced verification, continuous monitoring, and session termination in case of anomalies.

By way of a high level summary, the invention pertains to a sophisticated information security system and method designed for dual, simultaneous, single-session, proximity-based, secure authentication between a Digital Assisted Shopping (DAS) representative and a customer. The system facilitates secure interactions and financial transactions in unsecured remote locations by utilizing both an enterprise mobile device and a non-enterprise mobile device.

At the center of the invention are specialized mobile applications: a mobile banking application for the customer and an enterprise application for the DAS representative. These applications incorporate biometric identity verification to ensure that both the customer and the representative are authenticated using their biometric data, such as fingerprints or facial recognition.

The system employs Bluetooth Low Energy (BLE) technology to detect the proximity of the devices, ensuring they are within a predefined range before initiating a session. Upon confirming proximity, the system initiates a secure session via push notifications. A secure local handshake is performed, involving the exchange of encryption keys, generation of a shared session key using the Diffie-Hellman protocol or other, and mutual authentication using digital certificates or pre-shared keys. This process establishes a secure communication channel between the devices.

The system retrieves customer profiles and financial data from the bank's Customer Relationship Management (CRM) system and uses artificial intelligence (AI) and machine learning (ML) algorithms to analyze this data. Based on the analysis, the system generates personalized recommendations for financial accounts, products, and services, which are securely shared with the customer for review and selection.

Continuous geolocation monitoring ensures that both devices remain within a safe proximity range. Periodic background biometric re-verifications are performed seamlessly to maintain the security of the session. The system also facilitates real-time enrollment and transaction processing through the secure communication channel, allowing customers to quickly and efficiently open new accounts or apply for financial products.

In the event of any security breaches or anomalies, the system includes a session termination module that promptly ends the session and alerts both the customer and the representative. This comprehensive approach ensures that any potential threats are addressed immediately, maintaining the integrity and security of the system.

Overall, this invention provides a robust, efficient, and user-friendly solution for secure remote banking services, enabling DAS representatives and customers to engage in secure financial transactions without needing to visit a physical branch. The integration of advanced biometric verification, proximity detection, secure communication protocols, and AI-driven recommendations and security enhances the customer experience by providing convenience, safety, and personalized financial products, services, etc.

As a sample use case, a banking representative could set up a booth at a college fair to present various banking options to students. The representative uses an enterprise mobile device with an installed enterprise application designed for secure digital assisted shopping (DAS). Students who approach the booth have their own non-enterprise mobile devices with the bank's mobile banking application installed. The goal is to securely authenticate both parties, present banking options, and facilitate real-time enrollment in financial products and services.

The banking representative arrives at the college fair and sets up the booth. The enterprise mobile device is powered on, and the enterprise application is launched. The representative ensures the device is connected to the internet and ready for biometric verification. A student approaches the booth expressing interest in learning about banking options. The student already has the bank's mobile banking application installed on their non-enterprise mobile device. The representative explains the process of secure digital assisted shopping and asks the student to open the mobile banking application on their device.

If the student does not have the application, they are guided to download and install it. Once the application is open, the student is prompted to undergo biometric verification. The mobile banking application captures the student's biometric data, such as a fingerprint or facial recognition, and compares it to pre-stored biometric data to confirm the student's identity. Simultaneously, the representative uses the enterprise application on their device to perform their own biometric verification. The application captures the representative's biometric data and compares it to pre-stored data to confirm the representative's identity. This ensures that both parties are authenticated before proceeding.

The enterprise application uses Bluetooth Low Energy (BLE) technology to detect the proximity of the student's mobile device. The application confirms that the devices are within a predefined range, ensuring that both parties are physically close to each other. This step prevents remote attacks and ensures the session is initiated in a secure manner. Upon successful proximity detection, the enterprise application sends a push notification to the student's mobile banking application. This notification invites the student to initiate a digital assisted shopping session. The student receives and acknowledges the push notification, confirming their willingness to start the session.

The mobile banking application and the enterprise application perform a secure local handshake. This involves exchanging encryption keys using asymmetric encryption and generating a shared session key using the Diffie-Hellman key exchange protocol or the like. Mutual authentication is carried out using digital certificates or pre-shared keys, establishing a secure communication channel between the devices. The enterprise application retrieves the student's profile, financial account information, and transaction history from the bank's Customer Relationship Management (CRM) system. Push notifications prompt the student to review and approve or update their profile. The AI/ML module within the enterprise application analyzes the student's profile, transaction history, and financial goals to generate personalized recommendations for financial accounts, products, and services.

The representative uses the enterprise application to securely share the screen with the student's mobile banking application. The student can view detailed information about the recommended financial products and services, such as checking and savings accounts, student loans, credit cards, and investment options. The representative explains the benefits and features of each product, answering any questions the student may have. The student reviews the recommendations and selects the desired financial products and services through the mobile banking application. For example, the student might choose to open a student checking account and apply for a student credit card. The system performs any necessary enhanced verifications for high-value transactions or additional security requirements.

The secure cloud communication module facilitates real-time enrollment and transaction processing. The student electronically accepts the terms and conditions for the selected products and services on their mobile device. The system processes the enrollment, opening the desired accounts and initiating any selected services. Immediate confirmations are provided to the student, ensuring a seamless experience. Throughout the session, the geolocation monitoring module continuously tracks the locations of both the enterprise mobile device and the student's mobile device. This ensures that both devices remain within the required proximity range and are in a safe location. Periodic background biometric re-verifications are performed without disturbing the student or the representative, maintaining the integrity of the session.

Upon completion of the transactions, the session is terminated. If any security breaches, failed verifications, or prohibited locations are detected during the session, the session termination module logs the event and alerts both the student and the representative, providing details about the termination. This proactive approach ensures that any potential threats are addressed promptly. After the session, the student receives follow-up notifications and emails with details about their new accounts and services. The CRM system is updated with the new information, and the student can access their account details through the mobile banking application. The representative may also follow up with the student to ensure satisfaction and address any further questions.

This use case illustrates the practical application of the secure authentication and communication system in a real-world scenario. By leveraging advanced biometric verification, proximity detection, secure communication protocols, and AI-driven recommendations, the system ensures that students can securely and efficiently interact with banking representatives and access a wide range of financial products and services without needing to visit a physical branch. This enhances the customer experience, providing convenience, security, and personalized service.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models—Meta LLaMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models—Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

By way of non-limiting example, Generative AI can be utilized in conjunction with various aspects of this invention to create highly personalized financial product recommendations for customers and implement security measures as well as perform predictive information security. By analyzing the customer's financial history, spending patterns, and current financial goals, the system can generate tailored suggestions for products such as loans, credit cards, savings accounts, and investment opportunities. This not only enhances the user experience but also increases the likelihood of product adoption. Additionally, generative AI can be used to create customized communication and marketing materials in real-time. For example, based on the customer's interaction history and preferences, the system can generate personalized emails, notifications, and promotional content that align with their interests and needs. This dynamic content generation ensures that customers receive relevant and timely information, further enhancing their engagement with the banking services.

Machine learning (ML) can help analyze vast amounts of customer data to identify patterns and trends. By utilizing ML algorithms, the system can predict customer needs and behaviors, allowing for more accurate financial product recommendations. For instance, the ML models can analyze transaction histories and spending habits to suggest suitable budgeting tools or savings plans. Moreover, ML can be used to detect fraudulent activities by identifying unusual patterns in transaction data. This real-time fraud detection capability enhances the security of the banking services provided through the system. Furthermore, ML can improve the efficiency of customer service by automating routine tasks and providing instant responses to common queries, freeing up the DAS representative to focus on more complex customer needs Large language models (LLMs) such as GPT-4 can significantly enhance the customer interaction experience. LLMs can be integrated into the system to provide intelligent, conversational interfaces that assist customers in real-time. For example, an LLM can be used to power a chatbot that answers customer questions or provide information to customer representatives to allow them to answer questions directly in person, guides customers/representatives through the process of selecting financial products and helps them understand the terms and conditions of various services. The LLM can also assist the DAS representative by providing real-time information and suggestions during customer interactions, ensuring that the representative can offer accurate and helpful advice. Additionally, LLMs can be used to generate natural language explanations of complex financial concepts, making it easier for customers to understand the products and services being offered.

The combination of generative AI, machine learning, and large language models creates a powerful and intelligent system capable of delivering personalized, secure, and efficient banking services. By leveraging generative AI, the system can create highly customized recommendations and communication materials, enhancing customer engagement. Machine learning enables the system to analyze data, predict customer needs, detect fraud, and automate customer service tasks, improving both security and efficiency. Large language models enhance the customer interaction experience by providing intelligent conversational interfaces and real-time assistance, making it easier for customers to navigate the banking services. Together, these technologies ensure that the systems and methods of this invention can meet the evolving needs of customers while maintaining the highest standards of security and user satisfaction.

FIG. 1, by way of non-limiting disclosure, a detailed flow diagram of the information security system designed for dual, simultaneous, single-session, proximity-based secure authentication of a Digital Assisted Shopping (DAS) representative using an enterprise mobile device and a customer using a non-enterprise mobile device in an unsecured remote location. This system ensures secure, efficient, and seamless interaction between the DAS representative and the customer, even in remote environments.

The process begins with the customer capturing their biometric data using the mobile banking application installed on their non-enterprise mobile device (Step 100). This step ensures that the customer's identity is verified using advanced biometric techniques such as fingerprint scanning, facial recognition, or iris scanning. The captured biometric data is then compared with pre-stored biometric data (Step 108) to confirm the customer's identity. The comparison is carried out by the embedded security microservices within the mobile banking application, ensuring a high level of accuracy and security. This initial verification step is crucial to prevent unauthorized access and to establish a trusted identity for the customer.

Simultaneously, the DAS representative undergoes a similar biometric verification process. The representative captures their biometric data using the enterprise application installed on their enterprise mobile device (Step 102). This biometric data, which may include fingerprint, facial, or iris data, is then compared with pre-stored biometric data to verify the representative's identity (Step 104). This dual biometric verification process ensures that both parties involved in the transaction are legitimate and authorized. It provides a robust layer of security by validating the identities of both the customer and the DAS representative before any sensitive transactions can occur.

Once the identities of both the customer and the DAS representative are verified, the system proceeds to the proximity detection phase. The system utilizes Bluetooth Low Energy (BLE) technology to detect the proximity of the customer's non-enterprise mobile device and the DAS representative's enterprise mobile device (Step 112). This step confirms that both devices are within a predefined range, typically necessary for secure, proximity-based interactions. If the devices are within the required range, the system confirms their proximity (Step 114), allowing the process to move forward. This proximity detection helps ensure that the devices are close enough to enable a secure local communication channel, thus preventing remote attacks from distant unauthorized devices.

Following the confirmation of proximity, the enterprise application initiates a secure session by sending a push notification to the customer's mobile banking application (Step 116). This notification serves as a request to start a digital assisted shopping session. The customer receives and acknowledges the push notification (Step 118), thereby confirming their willingness to initiate the session. This acknowledgment is essential as it provides explicit consent from the customer to proceed with the secure interaction. The push notification mechanism also ensures that the customer is actively participating in the session initiation, adding an additional layer of user verification.

After the session is initiated, the next step involves establishing a secure local handshake between the mobile banking application and the enterprise application. This handshake process includes several security measures such as the exchange of encryption keys using asymmetric encryption techniques and the generation of a shared session key using a Diffie-Hellman key exchange protocol (Step 122) or the like. Additionally, mutual authentication is performed using digital certificates or pre-shared keys to ensure that both the customer and the DAS representative are legitimate participants in the session (Step 128). This secure handshake is fundamental in creating a trusted communication channel between the two devices. The encryption key exchange and mutual authentication ensure that the data exchanged during the session is protected against eavesdropping and tampering.

Once the secure local handshake is successfully established, a local wireless encrypted communication channel is set up between the mobile banking application and the enterprise application (Step 130). This encrypted channel ensures that all data exchanged during the session is protected from unauthorized access and interception. The use of robust encryption protocols such as TLS (Transport Layer Security) or SSL (Secure Socket Layer) guarantees the confidentiality and integrity of the communication. This secure communication channel is crucial for protecting sensitive financial information and maintaining the privacy of the customer and the DAS representative.

With the secure communication channel in place, the enterprise application retrieves the customer's profile and financial account information from the CRM system (Step 132). This data retrieval is necessary to provide the DAS representative with up-to-date and comprehensive information about the customer's financial status and history. The retrieved data is then analyzed using artificial intelligence (AI) and machine learning (ML) algorithms to generate personalized financial recommendations (Step 136). These advanced algorithms consider various factors such as the customer's transaction history, financial goals, and current market trends to propose suitable financial products and services. This AI/ML-driven analysis ensures that the recommendations are tailored to the specific needs and preferences of the customer, enhancing the overall customer experience.

Based on the analysis, the enterprise application identifies and proposes suitable financial accounts, products, and services to the customer (Step 138). This information is securely shared with the customer through the mobile banking application, utilizing secure screen sharing techniques to ensure confidentiality (Step 150). The customer can review the proposed financial services and make selections based on their preferences and needs (Step 158). The secure screen sharing ensures that sensitive information is only visible to the intended recipient, protecting the data from unauthorized access.

Once the customer makes their selections, the system facilitates the secure enrollment in the chosen financial services (Step 162). This involves the exchange of necessary enrollment materials and applications between the mobile banking application and the enterprise application over the encrypted communication channel. The customer electronically accepts the terms and conditions for the selected financial accounts, products, and services using the mobile banking application (Step 164). This acceptance is securely recorded and reported to the central banking system to finalize the enrollment process (Step 166). The secure enrollment process ensures that all necessary documentation and consents are captured accurately and securely, preventing fraud and ensuring regulatory compliance.

In cases where high-value transactions or additional security is required, the system performs enhanced verifications (Step 232). This may include additional biometric checks or the implementation of multi-factor authentication (MFA) using one-time passwords (OTPs), security questions (Step 234), passkeys, or the like. These enhanced security measures ensure that sensitive transactions are thoroughly vetted and protected against fraud. The use of MFA adds an additional layer of security by requiring the customer to verify their identity through multiple methods, making it more difficult for unauthorized users to gain access.

Throughout the session, the system continuously monitors the geolocation of both the enterprise and non-enterprise mobile devices using GPS, Wi-Fi, and cellular tracking technologies (Step 140). This continuous monitoring ensures that the devices remain within the required proximity range and in safe locations. Additionally, periodic background biometric re-verifications are performed to ensure that the authenticated users remain present and valid throughout the session (Step 146). These background checks are non-intrusive and seamlessly integrated into the session to maintain security without disrupting the user experience. The continuous monitoring and background re-verifications help detect and prevent unauthorized access, ensuring that the session remains secure.

If at any point during the session any security breaches, failed verifications, or prohibited locations are detected, the system terminates the session immediately (Step 164). The termination process involves logging the event and alerting both the customer and the DAS representative about the termination and the reasons behind it (Step 166). This ensures that any potential security threats are promptly addressed, maintaining the integrity and trustworthiness of the system. The session termination mechanism is a component for preventing unauthorized access and mitigating security risks in real-time.

While the primary flow described above covers the typical process for secure authentication and interaction, the system is also designed to handle various alternate flows and scenarios. For instance, if the initial biometric verification fails (Step 108 or Step 104), the system can prompt the user to re-capture their biometric data or provide alternative authentication methods such as a PIN or security question. This fallback mechanism ensures that legitimate users are not locked out due to temporary issues with biometric sensors.

Another potential alternate flow involves scenarios where the proximity detection (Step 112) fails due to interference or technical issues. In such cases, the system can attempt to re-establish the Bluetooth connection or use an alternative proximity detection method such as NFC (Near Field Communication). If proximity cannot be confirmed, the system will not proceed with the secure session initiation, thereby maintaining security integrity.

Additionally, if the secure local handshake (Step 122) fails due to issues with encryption key exchange or mutual authentication, the system can retry the handshake process or alert the user to potential security issues. This ensures that the communication channel is only established when both parties are securely authenticated.

In situations where enhanced verifications are required but the customer fails to provide the necessary additional authentication (e.g., OTP or additional biometric), the system can temporarily suspend the transaction and notify the DAS representative to follow up with the customer. This prevents unauthorized transactions and ensures that high-value actions are thoroughly vetted.

Moreover, if the continuous monitoring (Step 140) detects that the devices have moved out of the required proximity range or entered a prohibited location, the system can pause the session and prompt the users to return to an acceptable range before resuming. This feature ensures that the secure interaction remains within a controlled environment.

Figure 2:
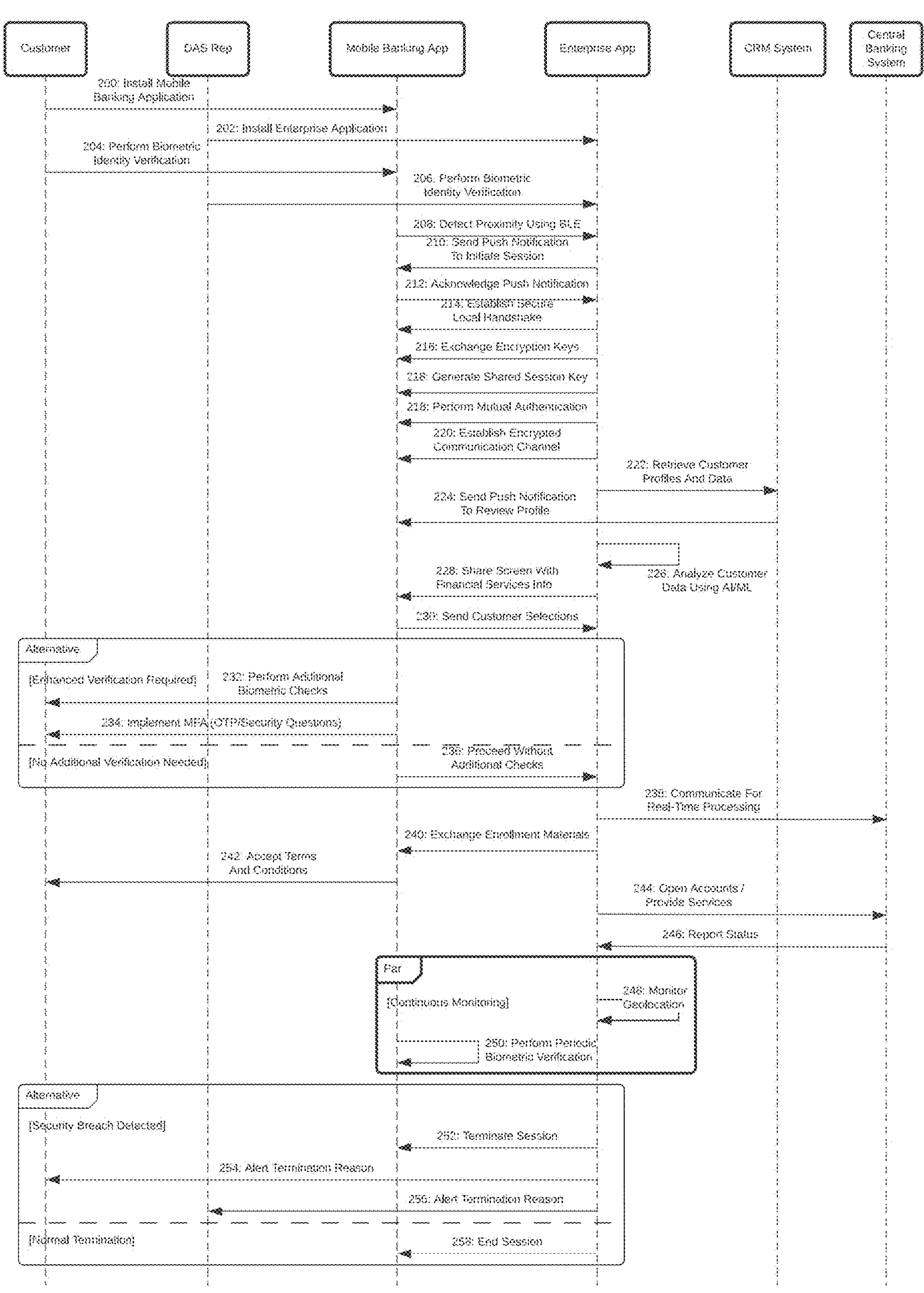
FIG. 2 depicts a sequence diagram illustrating the interactions between the customer, DAS representative, and various system components during the secure authentication and transaction process. The diagram outlines the step-by-step communication and data exchange, ensuring that each action is authenticated, encrypted, and securely transmitted to maintain the integrity and confidentiality of the session.

FIG. 2, by way of non-limiting disclosure, a sequence diagram that illustrates the interactions between various components of the information security system during a typical session of secure authentication and communication between a Digital Assisted Shopping (DAS) representative and a customer. This sequence of events ensures secure, efficient, and seamless execution of remote financial services. The main components involved are the Customer, DAS Representative, Mobile Banking Application, Enterprise Application, Bluetooth Proximity Detection Module, Push Notification Module, Secure Local Handshake Module, Local Wireless Encrypted Communication Module, CRM System, AI/ML Module, Geolocation Monitoring Module, Background Biometric Verification Module, and Session Termination Module.

Sequence 200: Install Mobile Banking Application—The sequence begins with the customer installing the Mobile Banking Application on their non-enterprise mobile device. This involves downloading the application from a secure source such as an app store or a direct link provided by the financial institution. Once downloaded, the application guides the customer through the setup process, which includes creating an account, setting up a secure password (or passkey), and configuring security settings like two-factor authentication (2FA).

Sequence 202: Install Enterprise Application—Concurrently, the DAS representative installs the Enterprise Application on their enterprise mobile device. This step is similar to the customer's setup but includes additional configurations to connect with the bank's backend systems and CRM databases. The representative authenticates their identity with the bank's system to gain access to customer data and session functionalities.

Sequence 204: Perform Biometric Identity Verification for Customer—Once the applications are installed, the Mobile Banking Application captures the customer's biometric data, such as fingerprint or facial recognition, and compares it to pre-stored data to verify the customer's identity. The biometric data capture process involves the customer placing their finger on a fingerprint sensor or positioning their face in front of the device's camera. The captured biometric data is then securely transmitted to the application for comparison.

Sequence 206: Perform Biometric Identity Verification for DAS Representative—Simultaneously, the Enterprise Application captures the DAS representative's biometric data and compares it to pre-stored data to verify the representative's identity. This step ensures that the representative is authorized to assist customers and access sensitive financial information.

Sequence 208: Detect Proximity Using BLE—The Bluetooth Proximity Detection Module detects when the non-enterprise mobile device and the enterprise mobile device are within a predefined Bluetooth proximity range. This detection process involves both devices continuously broadcasting Bluetooth signals and listening for signals from nearby devices. When the signals from both devices are detected within the predefined range, the system confirms their proximity.

Sequence 210: Send Push Notification To Initiate Session—Once proximity is confirmed, the Enterprise Application sends a push notification via the Push Notification Module to the Mobile Banking Application on the customer's device, inviting the customer to initiate a digital assisted shopping session. The push notification includes details about the DAS representative and the nature of the session to provide transparency and ensure that the customer is aware of the request.

Sequence 212: Acknowledge Push Notification—The customer receives and acknowledges the push notification, confirming their willingness to start the session. The acknowledgment process may include additional security measures such as entering a PIN or performing another biometric verification. This acknowledgment triggers the next phase of the process.

Sequence 214: Establish Secure Local Handshake—The secure local handshake phase follows, where the Mobile Banking Application and the Enterprise Application perform a secure local handshake through the Secure Local Handshake Module. This process includes exchanging encryption keys using asymmetric encryption and generating a shared session key using the Diffie-Hellman key exchange protocol.

Sequence 216: Exchange Encryption Keys—During the secure handshake, both applications generate cryptographic keys and securely exchange them. This key exchange establishes a foundation for secure communication between the devices.

Sequence 218: Generate Shared Session Key—The shared session key is generated from the exchanged encryption keys, providing a unique key for the current session. This key will be used to encrypt and decrypt data during the session, ensuring confidentiality and integrity.

Sequence 220: Perform Mutual Authentication—The Mobile Banking Application and the Enterprise Application perform mutual authentication using digital certificates or pre-shared keys. This step verifies that both devices are trusted and authorized to communicate securely.

Sequence 222: Establish Encrypted Communication Channel—With the secure local handshake completed, the Local Wireless Encrypted Communication Module establishes a secure, encrypted communication channel between the Mobile Banking Application and the Enterprise Application. This encrypted channel ensures that all data exchanged during the session is protected from unauthorized access and interception.

Sequence 224: Retrieve Customer Profiles and Data—The CRM System retrieves the customer's profile, financial account information, and transaction history and sends this data to the Enterprise Application. The CRM System uses secure APIs to fetch the required data from the central database, ensuring that the data is up-to-date and accurate.

Sequence 226: Analyze Customer Data Using AI/ML—The AI/ML Module analyzes the customer's profile, transaction history, and financial goals to generate personalized financial recommendations. The analysis involves using machine learning algorithms to identify patterns in the customer's financial behavior and preferences, allowing the system to suggest suitable products and services.

Sequence 228: Send Push Notification To Review Profile—The CRM System sends a push notification to the Mobile Banking Application, prompting the customer to review and confirm their profile information. This step ensures that the customer's data is accurate and up-to-date.

Sequence 230: Share Screen With Customer—The Enterprise Application shares the AI/ML-generated list of recommended financial accounts, products, and services with the customer via secure screen sharing. This secure screen sharing ensures that sensitive information is only visible to the intended recipient.

Sequence 232: Perform Additional Biometric Checks (if Enhanced Verification Required)—If the selected financial services involve high-value transactions or require additional security, the Enhanced Verification Module performs additional biometric checks. These checks ensure that only authorized users can complete high-value or sensitive transactions, adding an extra layer of security to the process.

Sequence 234: Implement MFA (OTP/Security Questions)—If required, the system may also implement multi-factor authentication (MFA), such as sending a one-time password (OTP) to the customer's registered mobile number or asking security questions. This additional step ensures further verification of the customer's identity.

Sequence 236: Proceed Without Additional Checks (if No Enhanced Verification Needed)—If no additional verification is required, the process proceeds without further checks. This pathway is followed for low-risk transactions where the initial verification is deemed sufficient.

Sequence 238: Communicate For Real-Time Processing—The Secure Cloud Communication Module facilitates real-time enrollment and transaction processing by securely communicating between the Enterprise Application and the central banking system. This involves sending encrypted requests and receiving confirmations from the central banking system.

Sequence 240: Exchange Enrollment Materials—The customer and the DAS representative exchange enrollment materials and application forms for the selected financial accounts, products, and services via the secure communication channel.

Sequence 242: Accept Terms and Conditions—The Mobile Banking Application enables the customer to electronically accept terms and conditions for the new accounts, products, and services. The acceptance is captured through digital signatures or other forms of electronic consent, which are legally binding and verifiable.

Sequence 244: Open Accounts/Provide Services—Upon acceptance of the terms and conditions, the system opens the new accounts, provides the requested products, or initiates the services for the customer. This step involves updating the customer's profile and account status in the CRM system.

Sequence 246: Report Status—The system reports the status of the transaction and the newly opened accounts or services to both the customer and the DAS representative. This report ensures transparency and confirmation that the requested actions have been completed successfully.

Sequence 248: Monitor Geolocation (Continuous Monitoring)—Throughout the session, the Geolocation Monitoring Module continuously monitors the geolocation of both the non-enterprise mobile device and the enterprise mobile device, ensuring they remain within the required proximity range and safe locations. The geolocation data is collected using GPS, Wi-Fi, and cellular triangulation, providing accurate and real-time tracking of the devices' locations.

Sequence 250: Perform Periodic Biometric Verification—The Background Biometric Verification Module performs periodic biometric re-verifications in the background, seamlessly ensuring that the authenticated users are still present. These continuous checks help maintain the integrity and security of the session without interrupting the user experience. The periodic biometric checks are designed to detect any unauthorized access or usage of the devices during the session.

Alternative Sequence 252: Terminate Session (if Security Breach Detected)—If any security breaches, discrepancies, or prohibited locations are detected, the Session Termination Module logs the event, terminates the session, and alerts both the customer and the DAS representative of the termination and the reason for it. The system logs detailed information about the reason for termination, including the detected anomaly, and sends alerts to both users to inform them about the termination. This process ensures that any potential security threats are promptly addressed, maintaining the system's integrity and trustworthiness. The alerts include recommendations for further actions, such as contacting customer support for assistance or initiating a new session once the issue is resolved.

Sequence 256: Alert Termination Reason—The Session Termination Module sends alerts to both the customer and the DAS representative, providing detailed information about the reason for termination. This alert includes the detected anomaly and any necessary steps to resolve the issue or initiate a new session.

Normal Termination Sequence 258: End Session—If no security breaches or anomalies are detected, the session proceeds to a normal termination. The Session Termination Module ends the session, ensuring that all communications and data exchanges are securely closed. The customer and the DAS representative are notified of the successful completion of the session, and all session-related data is securely stored or deleted according to the bank's policies.

FIG. 2 represents a sequence diagram for secure authentication and communication between a DAS representative and a customer. Here are potential alternate sequences, variations, and potential modifications or improvements to enhance the system's functionality and robustness:

Biometric Verification Failure and Recovery: If the initial biometric verification fails (Sequences 204 or 206), the system can implement a recovery process. The application can prompt the user to re-capture their biometric data. If the second attempt also fails, the system could offer alternative authentication methods, such as entering a password, PIN, or answering security questions. This fallback mechanism ensures that legitimate users are not locked out due to temporary issues with biometric sensors.

Proximity Detection Failure and Retrying: If the Bluetooth Proximity Detection Module fails to detect proximity (Sequence 208), the system can attempt to re-establish the Bluetooth connection multiple times before considering it a failure. If proximity cannot be confirmed after several attempts, the system can use alternative proximity detection methods, such as Near Field Communication (NFC) or Wi-Fi Direct. This redundancy ensures that the session can proceed even if one proximity detection method encounters issues.

Session Initiation without Push Notification: In cases where the push notification cannot be delivered (Sequence 210), possibly due to network issues or the customer's device settings, the system can use alternative methods to initiate the session. For example, the Enterprise Application could display a unique session code that the customer enters into their Mobile Banking Application. This method ensures that the session initiation can still occur even if push notifications are unreliable.

Enhanced Verification for High-Risk Locations: If the Geolocation Monitoring Module detects that the devices are in a high-risk or prohibited location (Sequence 248), the system can enforce additional verification steps before allowing the session to continue. For instance, the system could require a secondary biometric verification or multi-factor authentication (MFA) using a one-time password (OTP) sent to the user's registered mobile number. This additional layer of security helps mitigate risks associated with transactions in high-risk areas.

Handling Continuous Monitoring Interruptions: During continuous monitoring, if the Background Biometric Verification Module fails to re-verify the user's biometric data (Sequence 250) due to sensor issues or user inactivity, the system can notify the user to re-authenticate manually. This notification ensures that the session remains secure and that only authorized users can continue the interaction.

Potential variations include Multi-Device Authentication: Instead of limiting the session to two devices (the customer's and the DAS representative's devices), the system can be extended to support multi-device authentication. This would be useful in scenarios where a manager or supervisor needs to join the session for authorization or oversight. Each additional device would undergo the same biometric verification and proximity detection processes to ensure security.

Integration with External Authentication Providers: The system can integrate with external authentication providers such as Google Identity, Microsoft Azure AD, or Okta for Single Sign-On (SSO). This integration allows users to authenticate using their existing credentials with these providers, enhancing user convenience and leveraging the robust security features of these platforms. For example, users can authenticate via SSO using biometric data stored with the external provider, and the SSO token can be used for the session.

Passwordless Authentication: Implementing passwordless authentication using biometric data as the primary factor can enhance security and user experience. Solutions like passkeys, Microsoft Authenticator, or Duo Mobile can be used to confirm the user's identity through fingerprint, face, or other biometric data instead of passwords. This approach reduces the reliance on passwords, which can be vulnerable to phishing attacks.

Adaptive Authentication Based on Risk Analysis: The system can employ adaptive authentication, which adjusts the authentication requirements based on real-time risk analysis. For instance, if the system detects an unusual login attempt from a new location or device, it can require additional verification steps, such as biometric verification or MFA. This dynamic approach enhances security by responding to potential threats in real-time.

Federated Identity Management: Federated identity management solutions like SAML and OAuth 2.0 can be configured to use biometrics as part of the authentication process. When a user attempts to access an external service, the identity provider can prompt for biometric verification on the user's mobile device. This federated approach ensures consistent and secure authentication across multiple services and platforms.

Continuous Authentication with Behavioral Biometrics: Beyond periodic biometric checks, the system can implement continuous authentication using behavioral biometrics. This method analyzes user behavior patterns, such as typing speed, swipe patterns, and device handling, to continuously verify the user's identity during the session. If the system detects any deviation from the established behavior patterns, it can trigger additional verification steps or terminate the session.

Integration with Mobile Device Management (MDM) Solutions: The system can integrate with MDM solutions like VMware Workspace ONE or Microsoft Intune to enforce biometric authentication for accessing corporate resources. MDM solutions can require users to set up biometric authentication on their devices as part of the security policy, ensuring that only compliant devices can participate in the session.

Public Key Infrastructure (PKI) for Digital Signatures: The system can use digital certificates stored on mobile devices, protected by biometric authentication, to perform digital signatures. When a user attempts to sign a document, the device can prompt for biometric verification to unlock the certificate. This approach ensures that digital signatures are genuine and that only authorized users can perform them.

Geofencing for Enhanced Security: The system can implement geofencing to enhance security by defining virtual boundaries for the session. If the devices move outside these predefined boundaries, the system can trigger alerts, enforce additional verification steps, or terminate the session. Geofencing ensures that the session remains within a controlled and secure environment.

Automated Credential Management: Integrating with automated credential management solutions like 1Password, LastPass Enterprise, or Dashlane Business can enhance security by managing credentials securely. Users can authenticate with their biometrics to unlock access to stored credentials, ensuring that passwords, passkeys, and other sensitive information are protected and only accessible to authorized users.

Potential Modifications or Improvements include Enhanced Data Encryption: Implementing advanced encryption algorithms and protocols can further enhance the security of data exchanges between the Mobile Banking Application and the Enterprise Application. This includes using quantum-resistant encryption techniques to future-proof the system against potential threats from quantum computing.

User-Friendly Interface: Improving the user interface (UI) and user experience (UX) of both the Mobile Banking Application and the Enterprise Application can make the system more intuitive and easier to use. This includes providing clear instructions, easy navigation, and accessible design for users of all skill levels.

Real-Time Fraud Detection: Integrating real-time fraud detection algorithms that analyze transaction patterns and user behavior can help identify and mitigate fraudulent activities during the session. These algorithms can trigger alerts and require additional verification steps if suspicious activities are detected.

Cross-Platform Compatibility: Ensuring that the Mobile Banking Application and Enterprise Application are compatible with various operating systems and devices can expand the system's usability. This includes supporting Android, IOS, Windows, and other popular platforms, as well as different device types such as smartphones, tablets, and laptops.

Customizable Security Policies: Allowing financial institutions to customize security policies based on their specific requirements can enhance the system's adaptability. This includes setting different levels of authentication, encryption, and monitoring based on the institution's risk assessment and regulatory compliance needs.

Integration with Blockchain Technology: Integrating blockchain technology can enhance the transparency and security of transaction records. Blockchain can provide an immutable ledger of all transactions, ensuring that records are tamper-proof and verifiable.

AI-Driven Customer Support: Implementing AI-driven customer support within the Mobile Banking Application can provide users with real-time assistance during the session. This includes chatbots and virtual assistants that can answer questions, guide users through the process, and escalate issues to human representatives when necessary.

Localized Data Storage: Implementing localized data storage solutions can enhance data security and compliance with local regulations. This includes storing customer data in data centers located within the user's country or region, ensuring that data handling complies with local privacy laws and regulations.

Environmental Sensing: Integrating environmental sensors, such as light and sound sensors, can enhance security by detecting unusual environmental conditions that may indicate a compromised session. For example, if the system detects that the device is in a public space with high ambient noise, it can trigger additional verification steps.

Enhanced Accessibility Features: Ensuring that the applications are accessible to users with disabilities can broaden the system's usability. This includes providing features such as screen readers, voice commands, and customizable font sizes to accommodate users with visual, auditory, and motor impairments.

These alternate sequences, variations, and modifications demonstrate the flexibility and adaptability of the information security system. By incorporating these enhancements, the system can address a wide range of scenarios and provide robust, secure, and user-friendly remote financial services.

Figure 3:
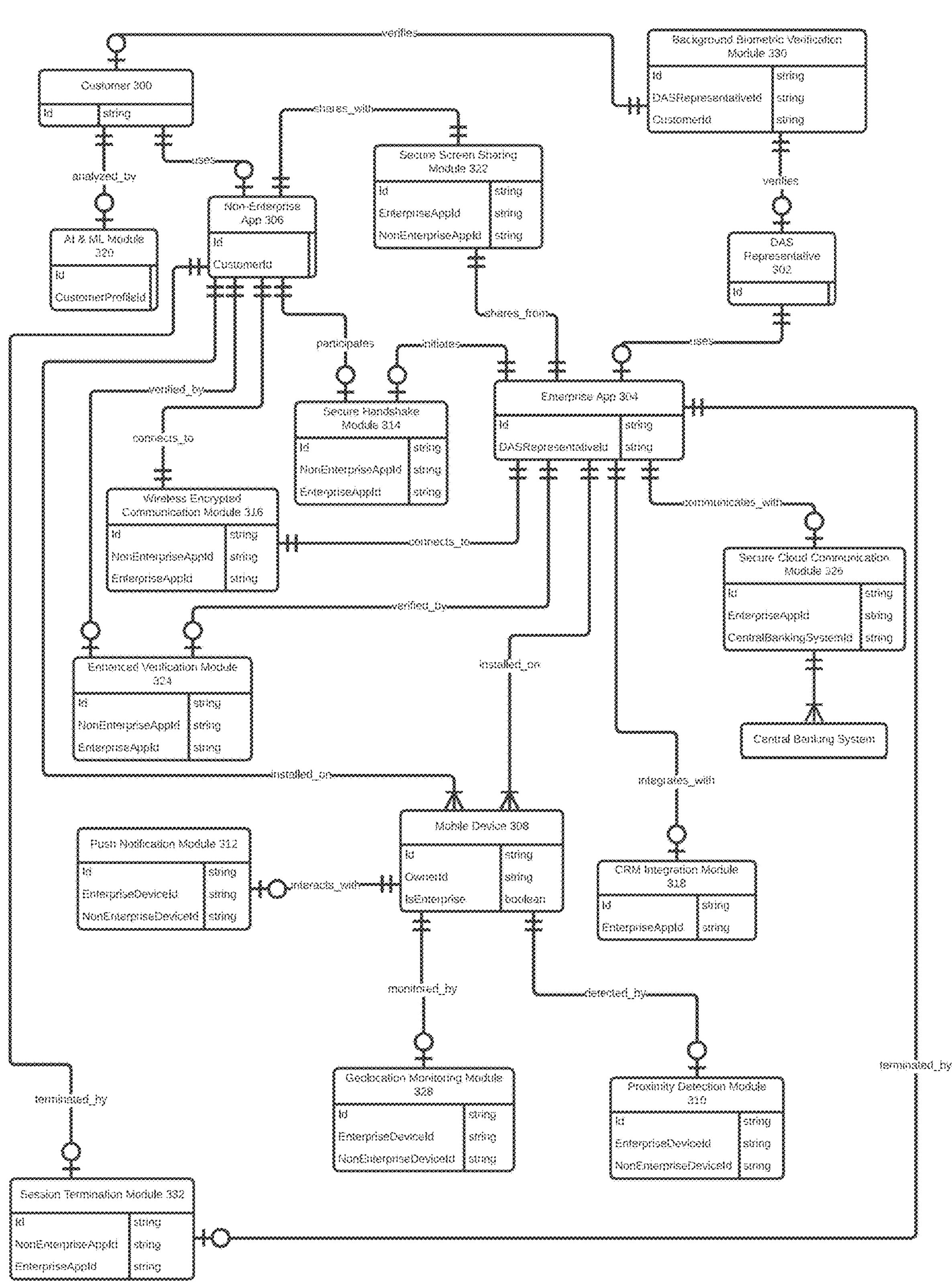
FIG. 3 illustrates an entity relationship diagram depicting the various entities involved in the secure authentication and communication system, and the relationships between them. The diagram includes entities such as Customer, DAS Representative, Mobile Banking Application, Enterprise Application, and various security modules, showcasing how data and interactions flow between these entities to ensure a secure and efficient session.

FIG. 3, by way of non-limiting disclosure, represents an entity relationship diagram that details the interactions and data flow between various components within the secure authentication and communication system for a Digital Assisted Shopping (DAS) representative and a customer. The primary entities involved are Customer (300), DAS Representative (301), Mobile Banking Application (302), Enterprise Application (303), Bluetooth Proximity Detection Module (304), Push Notification Module (305), Secure Local Handshake Module (306), Local Wireless Encrypted Communication Module (307), CRM System (308), AI/ML Module (309), Geolocation Monitoring Module (310), Background Biometric Verification Module (311), and Session Termination Module (312).

The Customer (300) entity represents the end user who interacts with the system through their non-enterprise mobile device. This entity includes attributes such as customerID, biometricData, and location. The customer uses the Mobile Banking Application (302) to provide their biometric data for identity verification. The application securely captures and transmits this biometric data to verify the customer's identity against pre-stored data in the CRM System (308). The customer also receives push notifications from the Push Notification Module (305) to initiate sessions and review their profile or transaction information. The CRM System (308) manages the customer's profile, transaction history, and other relevant data, ensuring it is up-to-date and accurate.

The DAS Representative (301) entity represents the financial services representative who uses the enterprise mobile device to assist the customer. This entity includes attributes such as representativeID, biometricData, and assignedLocation. The representative interacts with the Enterprise Application (303) to perform tasks such as initiating sessions, sending notifications, and verifying their identity using biometric data. The representative's biometric data is captured and verified against pre-stored data to ensure they are authorized to assist customers and access sensitive financial information.

The Mobile Banking Application (302) entity is installed on the customer's device and manages interactions with the customer. It includes attributes such as appVersion, customerProfile, and sessionData. The application captures the customer's biometric data and verifies their identity using secure methods. It also displays personalized financial recommendations generated by the AI/ML Module (309) and facilitates real-time enrollment and transaction processing by communicating with the Enterprise Application (303) and the central banking system. The Mobile Banking Application receives and processes push notifications from the Push Notification Module (305) to guide the customer through various stages of the session.

The Enterprise Application (303) entity is installed on the DAS representative's device and includes attributes such as appVersion, representativeProfile, and sessionData. This application interacts with the representative to capture their biometric data, verify their identity, and initiate secure sessions. The Enterprise Application shares screen information with the customer via secure screen sharing and communicates with other system modules to facilitate secure transactions and real-time processing.

The Bluetooth Proximity Detection Module (304) entity is responsible for detecting the proximity of the customer's and representative's devices. It includes attributes such as proximityRange and signalStrength. This module ensures that the devices are within a secure range to establish a local connection. It continuously broadcasts Bluetooth signals and listens for signals from nearby devices, confirming the physical proximity of the devices before allowing secure communication.

The Push Notification Module (305) entity manages the sending and receiving of push notifications between the Mobile Banking Application (302) and the Enterprise Application (303). It includes attributes such as notificationID and messageContent. The module ensures that notifications are delivered and acknowledged to initiate sessions and prompt user actions. It sends notifications to the customer's device to invite them to start a session, review their profile, or confirm transactions.

The Secure Local Handshake Module (306) entity facilitates the secure local handshake between the Mobile Banking Application (302) and the Enterprise Application (303). It includes attributes such as encryptionKeys and sessionKey. The module handles the exchange of encryption keys using asymmetric encryption, generates a shared session key using the Diffie-Hellman key exchange protocol, and performs mutual authentication using digital certificates or pre-shared keys. This process establishes a trusted communication channel between the two devices.

The Local Wireless Encrypted Communication Module (307) entity establishes a secure, encrypted communication channel between the Mobile Banking Application (302) and the Enterprise Application (303). It includes attributes such as encryptionProtocol and sessionID. The module ensures that all data exchanged during the session is protected from unauthorized access and interception. It uses robust encryption protocols such as TLS (Transport Layer Security) or SSL (Secure Socket Layer) to maintain the confidentiality and integrity of the data.

The CRM System (308) entity handles the retrieval and management of customer data, including profile, financial account information, and transaction history. It includes attributes such as customerData and transactionHistory. The CRM System interacts with both the Mobile Banking Application (302) and the Enterprise Application (303) to provide up-to-date and accurate customer information. It retrieves the customer's profile and transaction history to inform the DAS representative and the AI/ML Module (309) for generating personalized financial recommendations.

The AI/ML Module (309) entity analyzes customer data to generate personalized financial recommendations. It includes attributes such as analysisModels and recommendationResults. The module uses machine learning algorithms to analyze the customer's profile, transaction history, and financial goals, identifying patterns in the customer's financial behavior and preferences. It generates a list of recommended financial accounts, products, and services tailored to the customer's needs, which is shared with the Mobile Banking Application (302) for the customer to review.

The Geolocation Monitoring Module (310) entity continuously monitors the geolocation of both the non-enterprise mobile device and the enterprise mobile device. It includes attributes such as locationCoordinates and proximityThreshold. The module ensures that the devices remain within the required proximity range and safe locations throughout the session. It collects geolocation data using GPS, Wi-Fi, and cellular triangulation to provide accurate and real-time tracking of the devices' locations. If the devices move outside the predefined range or enter a prohibited area, the module can trigger alerts and initiate additional verification steps.

The Background Biometric Verification Module (311) entity performs periodic biometric re-verifications in the background to ensure that the authenticated users are still present. It includes attributes such as biometricData and verificationInterval. The module conducts continuous checks without interrupting the user experience, maintaining the integrity and security of the session. These periodic biometric checks are designed to detect any unauthorized access or usage of the devices during the session, ensuring that only the verified users remain active.

The Session Termination Module (312) entity handles the termination of the session if any security breaches, discrepancies, or prohibited locations are detected. It includes attributes such as terminationReason and eventLog. The module ensures that any potential security threats are promptly addressed by logging the event, terminating the session, and alerting both the customer and the DAS representative of the termination and its reason. Detailed information about the reason for termination, including the detected anomaly, is logged and alerts are sent to both users to inform them about the termination. This process maintains the system's integrity and trustworthiness and includes recommendations for further actions, such as contacting customer support for assistance or initiating a new session once the issue is resolved.

In conclusion, this entity relationship diagram intricately details how various components interact within the secure authentication and communication system, ensuring secure, efficient, and seamless execution of remote financial products, services, etc. between a DAS representative and a customer.

FIG. 3's entity relationship diagram outlines the interactions between various components within the secure authentication and communication system for a Digital Assisted Shopping (DAS) representative and a customer. Here are alternate configurations and potential improvements to enhance the system's functionality and robustness.

One alternate configuration involves decentralized biometric verification. Instead of centralizing biometric data verification, each device, the Customer's Mobile Banking Application and the DAS Representative's Enterprise Application, could locally verify biometric data. This approach reduces dependency on a centralized server, enhancing privacy and reducing latency. Another configuration is hybrid proximity detection, which uses a combination of Bluetooth Proximity Detection and Near Field Communication (NFC) for proximity verification. NFC provides an additional layer of security for close-range detection, ensuring that both devices are in very close proximity.

The system could also support multi-factor authentication (MFA) flexibility, allowing various MFA methods based on user preference or risk level, such as hardware tokens, email-based OTPs, or security questions, in addition to SMS-based OTPs. This provides flexibility and enhances security based on the context of the transaction. Deploying the CRM System in the cloud can allow seamless updates and integration with other cloud-based services, enhancing the scalability and availability of customer data management.

Integrating an AI-driven fraud detection module that continuously monitors transactions for suspicious activities is another potential improvement. This module can use machine learning models to analyze transaction patterns and trigger alerts or additional verification steps if anomalies are detected. Enhancing the Geolocation Monitoring Module with geofencing capabilities to define virtual boundaries can further improve security. If devices move outside these boundaries, the system can trigger contextual alerts and additional security measures, such as temporary session suspension.

Using blockchain technology for transaction verification and recording can enhance the transparency and security of transaction records. Blockchain provides an immutable and transparent ledger for all transactions, enhancing trust and security. Implementing edge computing to process data closer to the source, at the customer's and representative's devices, can reduce latency and enhance real-time decision-making, especially for biometric verification and proximity detection.

Allowing the system to dynamically adjust session parameters based on the context and risk level can further improve its flexibility. For example, high-value transactions might trigger shorter session durations, more frequent biometric checks, and tighter geolocation monitoring. Employing advanced encryption techniques, such as homomorphic encryption or post-quantum cryptography, can future-proof the system against emerging threats, ensuring data security even if encryption methods are targeted by advanced attacks.

User experience (UX) enhancements can improve the user interface (UI) of both the Mobile Banking Application and Enterprise Application. This includes intuitive navigation, clear instructions, and responsive design to ensure a seamless experience for users of all skill levels. Implementing comprehensive accessibility features to support users with disabilities can broaden the system's usability. This includes screen readers, voice commands, customizable font sizes, and color contrast adjustments to ensure the system is usable by everyone.

Integrating real-time language translation capabilities within the applications can support users who speak different languages, ensuring that customers and representatives can communicate effectively, regardless of language barriers. Utilizing predictive analytics within the AI/ML Module to anticipate customer needs and provide proactive recommendations can enhance customer satisfaction by offering relevant financial products and services before they are requested.

Enhancing the Push Notification Module to send context-aware notifications tailored based on the user's location, time of day, and transaction history ensures that notifications are relevant and timely. Providing users with granular privacy controls to manage their data builds user trust and compliance with privacy regulations. This includes options to control data sharing, manage consent, and review data access logs.

Developing an offline mode that allows basic functionalities to work without an active internet connection ensures continuous operation in areas with poor connectivity. The system can sync data and updates once the device reconnects to the internet. Integrating automated compliance checks ensures that all transactions and data handling processes comply with relevant regulations, including real-time monitoring and reporting for compliance with financial regulations like GDPR, CCPA, and AML laws.

Allowing financial institutions to customize security policies based on their specific requirements can enhance the system's adaptability. This includes defining different levels of authentication, encryption, and monitoring based on the institution's risk assessment and regulatory compliance needs. Providing a comprehensive data analytics dashboard for the DAS representative and financial institution administrators can offer insights into transaction patterns, customer behavior, and system performance, aiding in decision-making and strategy development.

These alternate configurations and potential improvements demonstrate the flexibility and adaptability of the information security system. By incorporating these enhancements, the system can address a wide range of scenarios and provide robust, secure, and user-friendly remote financial services.

Figure 4:
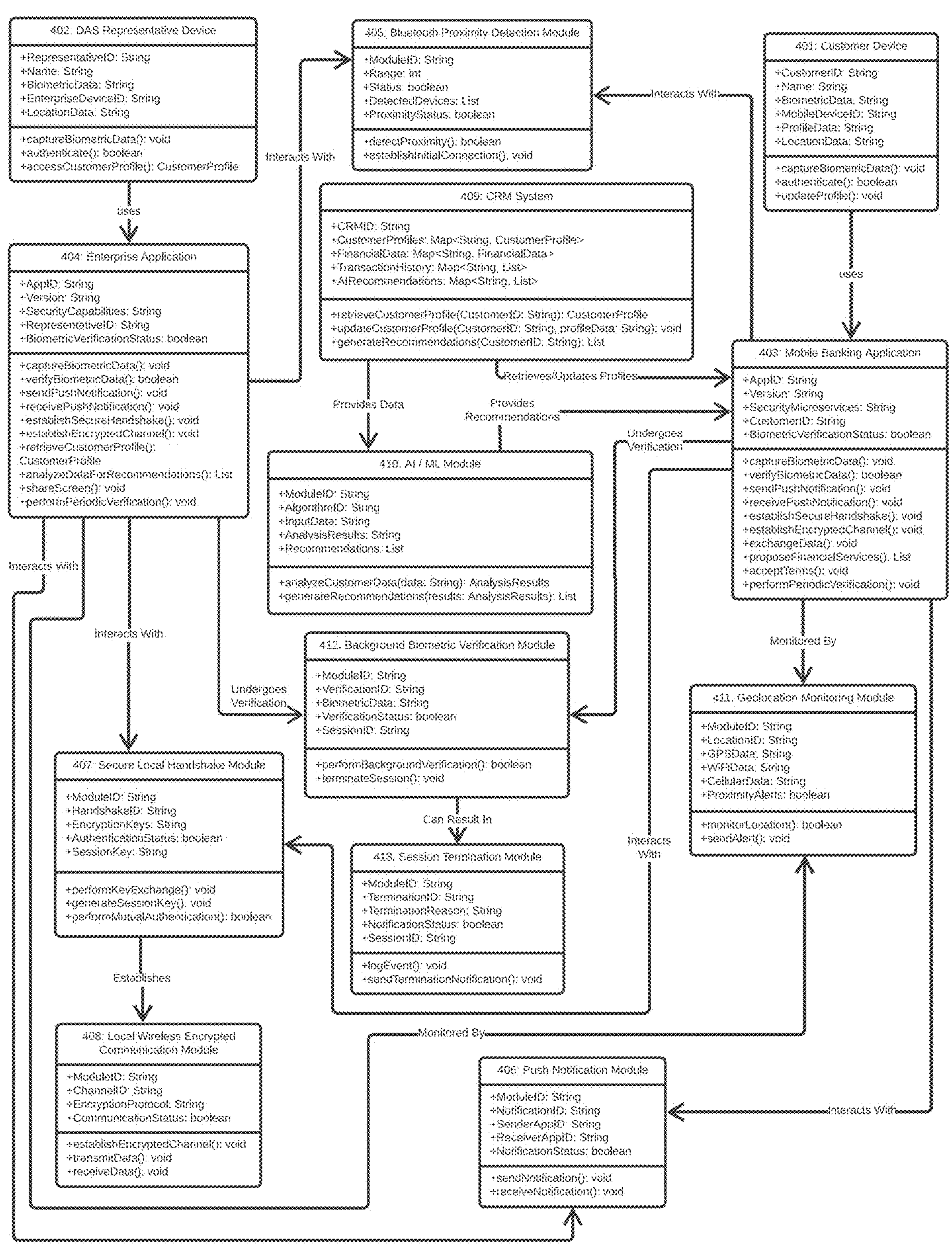
FIG. 4 illustrates a class diagram detailing the structure and relationships of various components within the information security system for dual, simultaneous, single-session, proximity-based secure authentication. The diagram includes classes such as Customer, DAS Representative, Mobile Banking Application, Enterprise Application, and several security modules, each identified by unique class numbers.

FIG. 4, by way of non-limiting disclosure, provides a comprehensive class diagram that outlines the key components and their interactions within the information security system designed for secure authentication and communication between a Digital Assisted Shopping (DAS) representative and a customer. The class diagram includes the following primary classes: Customer (400), DAS Representative (401), Mobile Banking Application (402), Enterprise Application (403), Bluetooth Proximity Detection Module (404), Push Notification Module (405), Secure Local Handshake Module (406), Local Wireless Encrypted Communication Module (407), CRM System (408), AI/ML Module (409), Geolocation Monitoring Module (410), Background Biometric Verification Module (411), and Session Termination Module (412). Each class contains specific attributes and methods that define its functionality and interactions with other classes.

The Customer (400) class represents the end user who uses the non-enterprise mobile device to access financial services remotely. This class includes attributes such as customerID, biometricData, and location. The methods associated with this class include captureBiometricData( ), authenticate( ), and receiveNotification( ). These methods enable the customer to capture their biometric data, authenticate their identity, and receive session-related notifications.

The DAS Representative (401) class represents the financial services representative using the enterprise mobile device to assist the customer. This class includes attributes such as representativeID, biometricData, and assignedLocation. The methods for this class include captureBiometricData( ), authenticate ( ), and sendNotification( ). These methods allow the representative to capture their biometric data, authenticate their identity, and send notifications to the customer's device.

The Mobile Banking Application (402) class is installed on the customer's non-enterprise mobile device. It includes attributes such as appVersion, customerProfile, and sessionData. The methods for this class include initiateSession( ), captureBiometricData( ), verifyIdentity( ), and displayRecommendations( ). These methods facilitate session initiation, biometric data capture, identity verification, and displaying financial recommendations to the customer.

The Enterprise Application (403) class is installed on the DAS representative's enterprise mobile device. This class includes attributes such as appVersion, representativeProfile, and sessionData. The methods associated with this class include initiateSession( ), captureBiometricData( ), verifyIdentity( ), and shareScreen( ). These methods enable the representative to initiate sessions, capture biometric data, verify identities, and share their screen with the customer.

The Bluetooth Proximity Detection Module (404) class is responsible for detecting the proximity between the customer's and the representative's devices. It includes attributes such as proximityRange and signalStrength. The methods for this class are detectProximity( ) and confirmProximity( ), which detect and confirm the proximity of the devices to ensure they are within the required range for secure communication.

The Push Notification Module (405) class manages the sending and receiving of push notifications between the Mobile Banking Application (402) and the Enterprise Application (403). This class includes attributes such as notificationID and messageContent. The methods for this class include sendNotification( ) and receiveNotification( ), which handle the delivery and acknowledgment of push notifications to initiate the session.

The Secure Local Handshake Module (406) class facilitates the secure local handshake between the Mobile Banking Application (402) and the Enterprise Application (403). It includes attributes such as encryptionKeys and sessionKey. The methods for this class are exchangeKeys( ), generateSessionKey( ), and performMutualAuthentication( ). These methods ensure that both devices can securely communicate by exchanging encryption keys, generating a session key, and performing mutual authentication.

The Local Wireless Encrypted Communication Module (407) class establishes a secure, encrypted communication channel between the Mobile Banking Application (402) and the Enterprise Application (403). This class includes attributes such as encryptionProtocol and sessionID. The methods for this class include establishChannel( ) and maintainChannel( ), ensuring continuous secure communication during the session.

The CRM System (408) class handles the retrieval and management of customer data, including profile, financial account information, and transaction history. This class includes attributes such as customerData and transactionHistory. The methods for this class are retrieveData( ) and updateData( ), which allow the Enterprise Application (403) to fetch and update customer information as needed.

The AI/ML Module (409) class analyzes customer data to generate personalized financial recommendations. It includes attributes such as analysisModels and recommendationResults. The methods for this class include analyzeData( ) and generateRecommendations( ), which use machine learning algorithms to tailor financial product suggestions to the customer's needs.

The Geolocation Monitoring Module (410) class continuously monitors the geolocation of both the non-enterprise mobile device and the enterprise mobile device. This class includes attributes such as locationCoordinates and proximityThreshold. The methods for this class are trackLocation( ) and verifyLocation( ), ensuring that both devices remain within the required proximity range and safe locations.

The Background Biometric Verification Module (411) class performs periodic biometric re-verifications in the background to ensure that the authenticated users are still present. This class includes attributes such as biometricData and verificationInterval. The methods for this class are performVerification( ) and scheduleNextVerification( ), maintaining continuous security without interrupting the user experience.

The Session Termination Module (412) class handles the termination of the session if any security breaches, discrepancies, or prohibited locations are detected. This class includes attributes such as terminationReason and eventLog. The methods for this class are logEvent( ), terminateSession( ), and alertUsers( ), ensuring that any potential security threats are promptly addressed, maintaining the system's integrity and trustworthiness.

FIG. 4 illustrates the primary classes and their interactions within the information security system designed for secure authentication and communication between a Digital Assisted Shopping (DAS) representative and a customer. Below are alternate classes and configurations, along with their functionalities, that could be implemented to enhance or adjust the system's capabilities.

The enhanced version of the Customer (400) class includes an additional attribute, deviceSecuritySettings, to store the security configurations of the customer's device. This class has methods such as captureBiometricData( ), authenticate( ), and receiveNotification( ), along with new methods checkDeviceSecurity( ) and encryptData( ). These additional methods ensure the device meets the security standards before starting the session and encrypt sensitive data locally.

The DAS Representative (401) class, in its enhanced form, includes an authorizationLevel attribute to define the representative's permission levels for various transactions and a sessionHistory attribute to keep a record of past sessions. Methods such as captureBiometricData( ), authenticate( ), and sendNotification( ) are supplemented by authorizeTransaction( ) and logSessionActivity( ), allowing the representative to approve or deny high-value transactions and record details of each session for auditing purposes.

The Mobile Banking Application (402) class installed on the customer's non-enterprise mobile device now includes userPreferences and securitySettings attributes to store personalized settings and security configurations. It has methods like initiateSession( ), captureBiometricData( ), verifyIdentity( ), and displayRecommendations( ), with added methods configureSecuritySettings( ), and updateUserPreferences( ). These enhancements allow the customer to customize their app experience and enhance security according to their preferences.

The Enterprise Application (403) class installed on the DAS representative's enterprise mobile device includes securitySettings and transactionLimits attributes to store configurations and set limits on transactions. Methods such as initiateSession( ), captureBiometricData( ), verifyIdentity( ), and shareScreen( ) are joined by configureSecuritySettings( ) and setTransactionLimits( ), enabling the DAS representative to adjust security settings and define transaction thresholds within the application.

The Bluetooth Proximity Detection Module (404) class, responsible for detecting the proximity between the customer's and the representative's devices, includes an interferenceLevel attribute to measure and manage signal interference and a deviceList attribute to keep track of nearby devices. Its methods detectProximity( ) and confirmProximity( ) are complemented by scanForInterference( ) and manageDeviceList( ), ensuring the detection of potential disruptions and maintaining a list of authorized devices within range.

The Push Notification Module (405) class manages the sending and receiving of push notifications between the Mobile Banking Application (402) and the Enterprise Application (403). It now includes a deliveryStatus attribute to monitor the success of notification deliveries and a retryCount attribute to track the number of retry attempts. Methods such as sendNotification( ) and receiveNotification( ) are enhanced by trackDeliveryStatus( ) and retryNotification( ), which ensure successful delivery and manage retries in case of failures.

The Secure Local Handshake Module (406) class facilitates the secure local handshake between the Mobile Banking Application (402) and the Enterprise Application (403). This class now includes handshakeStatus and keyExpirationTime attributes to monitor the handshake process and define the validity period of encryption keys. Its methods exchangeKeys( ), generateSessionKey( ), and performMutualAuthentication( ) are enhanced by monitorHandshakeStatus( ) and renewKeys( ), ensuring a successful handshake and managing the renewal of keys when they expire.

The Local Wireless Encrypted Communication Module (407) class establishes a secure, encrypted communication channel between the Mobile Banking Application (402) and the Enterprise Application (403). It includes new attributes such as connectionQuality and dataRate to monitor and manage the performance of the encrypted communication channel. Methods like establishChannel( ) and maintainChannel( ) are joined by monitorConnectionQuality( ) and adjustDataRate( ), ensuring a stable and efficient communication link.

The CRM System (408) class handles the retrieval and management of customer data, including profile, financial account information, and transaction history. It includes new attributes for dataEncryptionLevel and accessLogs to manage data security and track access to customer information. Methods such as retrieveData( ) and updateData( ) are supplemented by encryptData( ) and logAccess( ), ensuring that customer data is securely stored and access activities are recorded for auditing.

The AI/ML Module (409) class analyzes customer data to generate personalized financial recommendations. It includes new attributes for modelAccuracy and trainingData to track the performance of analysis models and manage the data used for training. Its methods analyzeData( ) and generateRecommendations( ) are enhanced by updateModels( ) and evaluateModelAccuracy( ), helping maintain and improve the accuracy of financial recommendations.

The Geolocation Monitoring Module (410) class continuously monitors the geolocation of both the non-enterprise mobile device and the enterprise mobile device. It includes new attributes for geoFencingStatus and locationHistory to manage virtual boundaries and track historical location data. Methods like trackLocation( ) and verifyLocation( ) are complemented by enforceGeoFencing( ) and recordLocationHistory( ), ensuring that the devices remain within safe locations and maintaining a log of location activities.

The Background Biometric Verification Module (411) class performs periodic biometric re-verifications in the background to ensure that the authenticated users are still present. It includes new attributes for verificationStatus and fallbackMethod to track the success of periodic verifications and define alternative verification methods. Its methods performVerification( ) and scheduleNextVerification( ) are enhanced by monitorVerificationStatus( ) initiateFallbackVerification( ), maintaining continuous security and providing fallback options if primary biometric verification fails.

The Session Termination Module (412) class handles the termination of the session if any security breaches, discrepancies, or prohibited locations are detected. It includes new attributes for alertType and recoveryOption to define the type of alerts sent to users and provide options for session recovery. Its methods logEvent( ), terminateSession( ), and alertUsers( ) are joined by initiateRecovery( ), ensuring users are informed of session termination reasons and offering steps to recover from terminations due to non-critical issues.

These alternate classes and configurations offer enhanced functionalities and flexibility, ensuring that the information security system can adapt to various scenarios and maintain high security, efficiency, and user experience standards.

Figure 5:
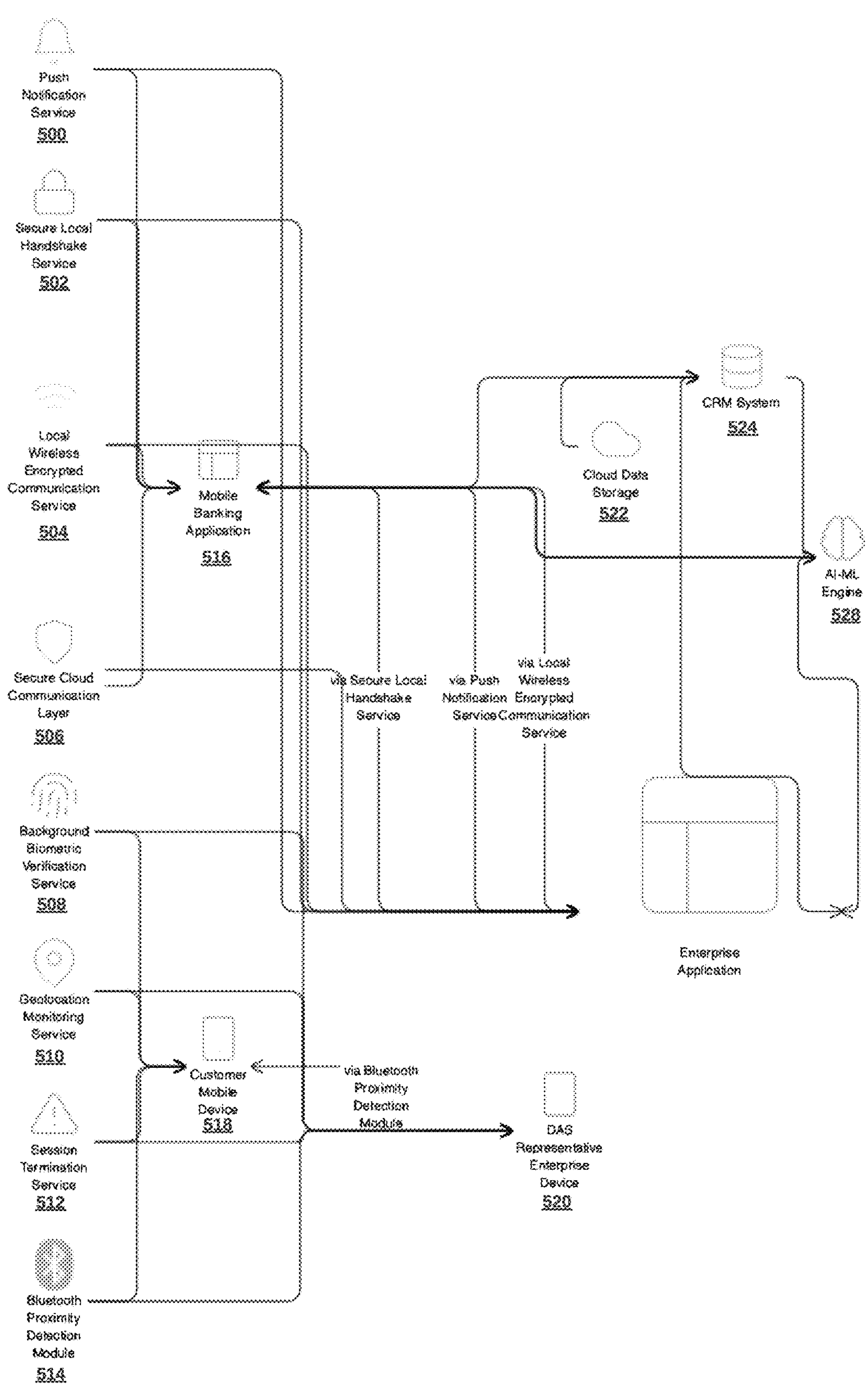
FIG. 5 illustrates a cloud architecture diagram detailing the components and their interactions within the secure authentication and communication system for a Digital Assisted Shopping (DAS) representative and a customer. The diagram includes elements such as customer and representative devices, cloud-based services, security modules, and data flow pathways, highlighting how these components work together to ensure secure and efficient remote financial services.

FIG. 5, by way of non-limiting disclosure, is a comprehensive cloud architecture diagram that illustrates the detailed structure and interactions within the secure authentication and communication system designed for a Digital Assisted Shopping (DAS) representative and a customer. The system is designed to ensure secure, efficient, and seamless remote financial services through a robust integration of various components.

The architecture begins with the customer device (500) and the representative device (502), which are the primary interfaces for the users. The customer device hosts the Mobile Banking Application (504), which captures biometric data, verifies identity, and handles initial secure authentication processes. This application is designed to interface with the Enterprise Application (506) installed on the representative device (502), enabling secure and efficient communication between the customer and the DAS representative.

The customer and representative devices are connected to a series of cloud-based services that manage different aspects of authentication, data processing, and secure communication. One of the components is the Bluetooth Proximity Detection Module (508), which ensures that the customer and representative devices are within a secure proximity range before initiating any transactions. This module continuously scans for Bluetooth signals to verify physical proximity, providing an essential layer of security to prevent remote attacks.

The Push Notification Module (510) facilitates the delivery and acknowledgment of push notifications between the Mobile Banking Application and the Enterprise Application. These notifications are beneficial for initiating sessions, prompting user actions, and providing updates throughout the transaction process. The ability to deliver timely and secure notifications ensures that both the customer and the representative are aware of and can respond to important events during the session.

The Secure Local Handshake Module (512) is responsible for handling the secure exchange of encryption keys and the generation of shared session keys using protocols like Diffie-Hellman. This module ensures that a secure communication channel is established between the devices, which is fundamental for protecting the integrity and confidentiality of the data exchanged during the session. The module performs mutual authentication using digital certificates or pre-shared keys, further strengthening the security of the communication channel.

The Local Wireless Encrypted Communication Module (514) manages the secure, encrypted communication channel between the Mobile Banking Application and the Enterprise Application. This module employs advanced encryption protocols such as TLS (Transport Layer Security) or SSL (Secure Socket Layer) to ensure that all data exchanged during the session is protected from unauthorized access and interception. The encryption protocols provide a robust defense against potential cyber threats, safeguarding sensitive financial information.

The CRM System (516) is another vital component that retrieves and manages customer data, including profiles, financial account information, and transaction history. It interacts with both the Mobile Banking Application and the Enterprise Application to provide up-to-date and accurate customer information. The CRM System uses secure APIs to fetch the required data from the central database, ensuring the data's accuracy and relevance.

The AI/ML Module (518) analyzes the customer data to generate personalized financial recommendations. This module employs machine learning algorithms to analyze the customer's profile, transaction history, and financial goals, identifying patterns in the customer's financial behavior and preferences. The AI/ML Module then generates a list of recommended financial accounts, products, and services tailored to the customer's needs. These recommendations are shared with the Mobile Banking Application, allowing the customer to review and select the desired financial options.

The Geolocation Monitoring Module (520) continuously monitors the geolocation of both the customer's and the representative's devices, ensuring they remain within the required proximity range and safe locations throughout the session. This module collects geolocation data using GPS, Wi-Fi, and cellular triangulation to provide accurate and real-time tracking of the devices' locations. If the devices move outside the predefined range or enter a prohibited area, the module can trigger alerts and initiate additional verification steps to maintain the session's security.

The Background Biometric Verification Module (522) performs periodic biometric re-verifications in the background to ensure that the authenticated users are still present. These continuous checks help maintain the integrity and security of the session without interrupting the user experience. The periodic biometric checks are designed to detect any unauthorized access or usage of the devices during the session, ensuring that only the verified users remain active.

The Session Termination Module (524) handles the termination of the session if any security breaches, discrepancies, or prohibited locations are detected. This module logs detailed information about the reason for termination and sends alerts to both users to inform them about the termination. The alerts include recommendations for further actions, such as contacting customer support for assistance or initiating a new session once the issue is resolved. This module ensures that any potential security threats are promptly addressed, maintaining the system's integrity and trustworthiness.

The Secure Cloud Communication Module (526) facilitates real-time enrollment and transaction processing by securely communicating between the Enterprise Application and the central banking system. This module handles encrypted requests and confirmations to ensure that all interactions are protected from interception. The secure communication involves sending encrypted requests and receiving confirmations from the central banking system, ensuring that all interactions are protected from interception.

Overall, the architecture diagram in FIG. 5 showcases a highly integrated system where each component works in unison to provide a secure, efficient, and user-friendly remote financial service experience. The detailed interactions and robust security measures ensure that both customers and DAS representatives can engage in secure transactions with confidence. Each module plays a critical role in ensuring the system's overall security, efficiency, and user-friendliness, providing a seamless experience for all users involved.

The entity relationship diagram depicted in FIG. 3 can be enhanced through various alternate configurations and potential improvements. One potential configuration is to decentralize biometric verification, allowing each device, whether the customer's Mobile Banking Application or the DAS Representative's Enterprise Application, to locally verify biometric data. This approach reduces dependency on a centralized server, enhancing privacy and reducing latency. Another alternate configuration involves employing hybrid proximity detection, which combines Bluetooth Proximity Detection with Near Field Communication (NFC) for added security, ensuring devices are in very close proximity. The system can also support flexible multi-factor authentication (MFA) methods based on user preference or risk level, such as hardware tokens, email-based OTPs, or security questions in addition to SMS-based OTPs, thereby enhancing security according to the transaction context.

Deploying the CRM System in the cloud can facilitate seamless updates and integration with other cloud-based services, improving scalability and availability of customer data management. Integrating an AI-driven fraud detection module that continuously monitors transactions for suspicious activities is another valuable improvement. This module can use machine learning models to analyze transaction patterns and trigger alerts or additional verification steps if anomalies are detected. Enhancing the Geolocation Monitoring Module with geofencing capabilities can define virtual boundaries and trigger contextual alerts or additional security measures if devices move outside these boundaries, providing an additional layer of security.

Using blockchain technology for transaction verification and recording can enhance transparency and security, creating an immutable and transparent ledger for all transactions. Implementing edge computing can process data closer to the source, reducing latency and enhancing real-time decision-making, especially for biometric verification and proximity detection. Allowing the system to dynamically adjust session parameters based on context and risk level can further improve flexibility, with high-value transactions triggering shorter session durations, more frequent biometric checks, and tighter geolocation monitoring.

Employing advanced encryption techniques such as homomorphic encryption or post-quantum cryptography can future-proof the system against emerging threats, ensuring data security even if targeted by advanced attacks. Enhancing user experience (UX) through improved user interfaces (UI) for both the Mobile Banking Application and Enterprise Application ensures a seamless experience for users of all skill levels. Implementing comprehensive accessibility features to support users with disabilities, such as screen readers, voice commands, customizable font sizes, and color contrast adjustments, can broaden the system's usability.

Integrating real-time language translation capabilities within the applications can support users who speak different languages, ensuring effective communication between customers and representatives. Utilizing predictive analytics within the AI/ML Module to anticipate customer needs and provide proactive recommendations can enhance customer satisfaction by offering relevant financial products and services before they are requested. Enhancing the Push Notification Module to send context-aware notifications tailored to the user's location, time of day, and transaction history ensures that notifications are relevant and timely.

Providing users with granular privacy controls to manage their data, including options to control data sharing, manage consent, and review data access logs, builds user trust and ensures compliance with privacy regulations. Developing an offline mode that allows basic functionalities to work without an active internet connection ensures continuous operation in areas with poor connectivity, with the system syncing data and updates once the device reconnects to the internet. Integrating automated compliance checks ensures that all transactions and data handling processes comply with relevant regulations, including real-time monitoring and reporting for compliance with financial regulations like GDPR, CCPA, and AML laws.

Allowing financial institutions to customize security policies based on their specific requirements can enhance the system's adaptability, defining different levels of authentication, encryption, and monitoring based on the institution's risk assessment and regulatory compliance needs. Providing a comprehensive data analytics dashboard for the DAS representative and financial institution administrators offers insights into transaction patterns, customer behavior, and system performance, aiding in decision-making and strategy development. These alternate configurations and potential improvements demonstrate the flexibility and adaptability of the information security system, addressing a wide range of scenarios to provide robust, secure, and user-friendly remote financial services.

Sample pseudocode to implement various aspects of the invention can be understood as follows with respect to Initialization and Setup as follows:

```
class CustomerDevice:
  def_init_(self):
    self.app_installed=False
    self.biometric_data=None
    self.location=None
    self.proximity_detected=False
  def install_mobile_banking_app(self):
    self.app_installed=True
  def capture_biometric_data(self, data):
    self.biometric_data=data
  def verify_biometric(self, stored_data):
    return self.biometric_data==stored_data
class RepresentativeDevice:
  def_init_(self):
    self.app_installed=False
    self.biometric_data=None
    self.location=None
    self.proximity_detected=False
  def install_enterprise_app(self):
    self.app_installed=True
  def capture_biometric_data(self, data):
    self.biometric_data=data
  def verify_biometric(self, stored_data):
    return self.biometric_data==stored_data
class BluetoothProximityDetection:
  def_init_(self, customer_device, representative_device):
    self.customer_device=customer_device
    self.representative_device=representative_device
  def detect_proximity(self):
    #Simulate proximity detection
    if self.customer_device.location==self.representative_device.location:
      self.customer_device.proximity_detected=True
      self.representative_device.proximity_detected=True
    else:
      self.customer_device.proximity_detected=False
      self.representative_device.proximity_detected=False
class PushNotification:
  def send_notification(self, device, message):
    device.notification=message
class SecureLocalHandshake:
  def establish_handshake(self, customer_device, representative_device):
    if customer_device.proximity_detected and representative_device.proximity_detected:
      return "Secure Handshake Established"
    return "Handshake Failed"
class EncryptedCommunication:
  def establish_channel(self):
    return "Encrypted Communication Channel Established"
class CRMSystem:
  def_init_(self):
    self.customer_profiles={ }
  def retrieve_customer_profile(self, customer_id):
    return self.customer_profiles.get(customer_id, None)
  def update_customer_profile(self, customer_id, profile):
    self.customer_profiles[customer_id]=profile
class AI_ML_Module:
  def generate_recommendations(self, customer_profile):
    #Simulate AI/ML-based recommendation
    return ["Product A", "Product B", "Product C"]
class GeolocationMonitoring:
  def monitor_location(self, customer_device, representative_device):
    if customer_device.location and representative_device.location:
      return True
    return False
class BackgroundBiometricVerification:
  def verify_periodically(self, device):
    #Simulate periodic biometric verification
    return device.verify_biometric(device.biometric_data)
class SessionTermination:
  def terminate_session(self, reason):
    return f"Session Terminated: {reason}"
```

Sample pseudocode to implement a main workflow could be as follows:

```
def main_workflow( ):
  #Initialize devices and modules
  customer_device=CustomerDevice( )
  representative_device=RepresentativeDevice( )
  proximity_detection=BluetoothProximityDetection(customer_device, representative_device)
  push_notification=PushNotification( )
  secure_handshake=SecureLocalHandshake( )
  encrypted_comm=EncryptedCommunication( )
  crm_system=CRMSystem( )
  ai_ml_module=AI_ML_Module( )
  geolocation_monitoring=GeolocationMonitoring( )
  background_biometric_verification=BackgroundBiometricVerification( )
  session_termination=SessionTermination( )
  #Step 200: Install Mobile Banking Application
  customer_device.install_mobile_banking_app( )
  #Step 202: Install Enterprise Application
  representative_device.install_enterprise_app( )
  #Step 204 & 206: Perform Biometric Identity Verification
  customer_device.capture_biometric_data("customer_bio_data")
  representative_device.capture_biometric_data("rep_bio_data")
  if not customer_device.verify_biometric("customer_bio_data") or not representative_device.verify_biometric("rep_bio_data"):
```

```
        return session_termination.terminate_session("Biometric Verification Failed")
    #Step 208: Detect Proximity Using BLE
    customer_device.location="location_1"
    representative_device.location="location_1"
    proximity_detection.detect_proximity( )
    if not customer_device.proximity_detected or not representative_device.proximity_detected:
        return session_termination.terminate_session("Proximity Detection Failed")
    #Step 210: Send Push Notification To Initiate Session
    push_notification.send_notification(customer_device, "Initiate Session")
    #Step 212: Acknowledge Push Notification
    if customer_device.notification !="Initiate Session":
        return session_termination.terminate_session("Session Initiation Failed")
    #Step 214: Establish Secure Local Handshake
    handshake_status=secure_handshake.establish_handshake(customer_device, representative_device)
    if handshake_status !="Secure Handshake Established":
        return session_termination.terminate_session("Handshake Failed")
    #Step 220: Establish Encrypted Communication Channel
    comm_channel_status=encrypted_comm.establish_channel( )
    if comm_channel_status !="Encrypted Communication Channel Established":
        return session_termination.terminate_session("Communication Channel Establishment Failed")
    #Step 222: Retrieve Customer Profiles And Data
    customer_profile=crm_system.retrieve_customer_profile("customer_id_123")
    if not customer_profile:
        return session_termination.terminate_session("Customer Profile Retrieval Failed")
    #Step 226: Analyze Customer Financial Services Info Data Using AI/ML
    recommendations=ai_ml_module.generate_recommendations(customer_profile)
    #Step 230: Send Customer Selections
    selected_products=recommendations[:2] #Simulate customer selecting first two products
    #Step 232 & 234: Perform Additional Biometric Checks if Enhanced Verification Required
    if "High-Value Transaction" in selected_products:
        if not background_biometric_verification.verify_periodically(customer_device):
            return session_termination.terminate_session("Periodic Biometric Verification Failed")
    #Step 238: Communicate For Real-Time Processing
    #Simulate real-time processing
    #Step 248 & 250: Monitor Geolocation and Perform Periodic Biometric Verification
    if not geolocation_monitoring.monitor_location(customer_device, representative_device):
        return session_termination.terminate_session("Geolocation Monitoring Failed")
    if not background_biometric_verification.verify_periodically(representative_device):
        return session_termination.terminate_session("Periodic Biometric Verification Failed")
    #Step 252: Terminate Session
    return session_termination.terminate_session("Normal Termination")
#Execute the main workflow
main_workflow( )
```

The following provides a detailed explanation of the foregoing sample pseudocode for reference.

The pseudocode begins with the definition of several classes that represent different components of the system. The CustomerDevice and RepresentativeDevice classes manage the installation of the respective applications and the capturing and verification of biometric data. These classes also handle location data, which is crucial for proximity detection.

The BluetoothProximityDetection class ensures that the customer and representative devices are within a predefined proximity range before initiating any transactions. This is done by continuously scanning for Bluetooth signals and confirming their physical proximity.

The PushNotification class manages the sending and receiving of notifications between the customer and representative devices, which are essential for initiating sessions and prompting user actions.

The SecureLocalHandshake class establishes a secure handshake between the devices by exchanging encryption keys and generating a shared session key using protocols like Diffie-Hellman. This step ensures that a secure communication channel is established.

The EncryptedCommunication class manages the establishment of an encrypted communication channel between the customer and representative devices, using advanced encryption protocols such as TLS or SSL to protect data exchanged during the session.

The CRMSystem class retrieves and manages customer data, including profiles, financial account information, and transaction history. This data is used by the AI_ML_Module to generate personalized financial recommendations based on the customer's profile and transaction history.

The GeolocationMonitoring class continuously monitors the geolocation of both devices to ensure they remain within a required proximity range and safe locations throughout the session. If the devices move outside the predefined range, the system triggers alerts and initiates additional verification steps.

The BackgroundBiometricVerification class performs periodic biometric re-verifications in the background to ensure that the authenticated users are still present. This helps maintain the integrity and security of the session without interrupting the user experience.

The SessionTermination class handles the termination of the session if any security breaches, discrepancies, or prohibited locations are detected. It logs detailed information about the reason for termination and sends alerts to both users.

In the main_workflow function, the pseudocode follows the sequence of events as outlined in FIG. 2. The customer and representative devices install their respective applications, perform biometric verification, and detect proximity using Bluetooth. The system sends a push notification to the customer to initiate the session, which the customer acknowledges. A secure local handshake is established, followed by setting up an encrypted communication channel. The system retrieves the customer profile from the CRM system and generates financial recommendations using the AI/ML module. The customer selects the desired products, and if any high-value transactions are involved, additional biometric checks are performed. The system then monitors the geolocation and performs periodic biometric verification throughout the session. Finally, the session is terminated normally or due to any detected issues.

This pseudocode provides a high-level implementation of the secure authentication and communication system, demonstrating how different components interact to ensure a secure and efficient user experience.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An information security method for dual, simultaneous, single-session, proximity-based, secure authentication of a Digital Assisted Shopping (DAS) representative for using an enterprise mobile device and a customer using a non-enterprise mobile device in an unsecured remote location, the method comprising the steps of:

securely installing a mobile banking application on the non-enterprise mobile device of the customer, the mobile banking application including embedded security microservices for biometric identity verification;

performing biometric identity verification of the customer on the non-enterprise mobile device using the mobile banking application;

securely installing an enterprise application on the enterprise mobile device of the DAS representative, the enterprise application including biometric identity verification capabilities;

performing biometric identity verification of the DAS representative on the enterprise mobile device using the enterprise application;

automatically detecting the proximity of the non-enterprise mobile device and the enterprise mobile device when within a predefined Bluetooth proximity range;

sending a push notification from the enterprise mobile device to the non-enterprise mobile device to initiate a digital assisted shopping session;

receiving an acknowledgment of the push notification from the non-enterprise mobile device, confirming the initiation of the digital assisted shopping session;

establishing a secure local handshake between the mobile banking application on the non-enterprise mobile device and the enterprise application on the enterprise mobile device by exchanging encryption keys and performing mutual authentication;

establishing a local wireless encrypted communication channel between the mobile banking application and the enterprise application using the encryption keys;

retrieving a customer profile and existing financial accounts, products, and services from a Customer Relationship Management (CRM) system to the enterprise application;

sending a push notification from the CRM system to the mobile banking application prompting the customer to review and approve or update the customer profile;

utilizing artificial intelligence (AI) or machine learning (ML) algorithms to analyze the customer profile, transaction history, and financial goals to identify financial accounts, financial products, and financial services (Financial APS) suitable for the customer and to provide identity security to avoid spoofing;

securely sharing a screen from the enterprise application to the mobile banking application to provide information regarding the Financial APS that are available;

receiving desired selections for the Financial APS from the customer via the mobile banking application;

performing enhanced verifications if the desired selections for the Financial APS require additional security;

communicating over a secure cloud connection between the enterprise application and a central banking system to facilitate enrollment in the Financial APS according to the desired selections;

wirelessly communicating locally between the non-enterprise mobile device and the enterprise mobile device to exchange enrollment materials and applications for the Financial APS according to the desired selections;

electronically accepting terms and conditions for the Financial APS according to the desired selections on the non-enterprise mobile device;

opening the desired accounts, providing the selected products, or initiating the selected services in response to the electronic acceptance;

reporting the opening of accounts, provision of products, or initiation of services to the central banking system;

continuously monitoring geolocation of both the enterprise mobile device and the non-enterprise mobile device to confirm proximity and verify that the DAS representative and the customer are not in a prohibited location or dangerous location;

performing periodic background biometric verification of both the customer and the DAS representative during the single session without disturbing them; and terminating the session if any security breaches, failed verifications, or prohibited locations are detected during the session.

2. The method of claim 1, wherein the step of performing biometric identity verification of the customer on the non-enterprise mobile device further comprises:

capturing biometric data using the mobile banking application's embedded security microservices; and comparing the captured biometric data to pre-stored biometric data for the customer to confirm customer identity.

3. The method of claim 2, wherein the step of performing biometric identity verification of the DAS representative on the enterprise mobile device further comprises:

capturing biometric data using the enterprise application's biometric identity verification capabilities; and comparing the captured biometric data to pre-stored biometric data for the DAS representative to confirm representative identity.

4. The method of claim 3, wherein the step of automatically detecting the proximity of the non-enterprise mobile device and the enterprise mobile device further comprises:

utilizing Bluetooth Low Energy (BLE) technology to detect when the devices are within the predefined proximity range; and establishing an initial connection based on the detected proximity.

5. The method of claim 4, wherein the step of establishing a secure local handshake further comprises:

using asymmetric encryption to exchange public keys between the non-enterprise mobile device and the enterprise mobile device; and generating a shared session key using a Diffie-Hellman key exchange protocol;

performing mutual authentication using digital certificates or pre-shared keys.

6. The method of claim 5, wherein the step of establishing a local wireless encrypted communication channel further comprises:

using Transport Layer Security (TLS) or Secure Socket Layer (SSL) protocols to encrypt data transmitted between the mobile banking application and the enterprise application; and utilizing Wi-Fi Direct or Near Field Communication (NFC) for direct device-to-device connections.

7. The method of claim 6, wherein the step of performing enhanced verifications further comprises:

requiring additional biometric checks for high-value transactions; and implementing multi-factor authentication (MFA) using one-time passwords (OTPs) or security questions for critical actions.

8. The method of claim 7, wherein the step of continuous monitoring of geolocation further comprises:

using GPS, Wi-Fi, and cellular data to track the locations of the enterprise mobile device and the non-enterprise mobile device; and sending real-time alerts if the devices move out of a required proximity range or enter a prohibited area.

9. The method of claim 8, wherein the step of performing periodic background biometric verification further comprises:

integrating non-intrusive biometric checks seamlessly into the mobile banking application's operation to verify authorized user identity without disturbing the session; and terminating the session if any discrepancies or failed verifications are detected during the session.

10. An information security system for dual, simultaneous, single-session, proximity-based, secure authentication of a Digital Assisted Shopping (DAS) representative using an enterprise mobile device and a customer using a non-enterprise mobile device in an unsecured remote location, the system comprising:

a non-transitory computer-readable medium storing instructions that, when executed by one or more processors of the enterprise mobile device and the non-enterprise mobile device, cause the enterprise mobile device and the non-enterprise mobile device to implement:

a mobile banking application installed on the non-enterprise mobile device of the customer, the mobile banking application including embedded security microservices for biometric identity verification;

an enterprise application installed on the enterprise mobile device of the DAS representative, the enterprise application including biometric identity verification capabilities;

a Bluetooth proximity detection module configured to detect the proximity of the non-enterprise mobile device and the enterprise mobile device when within a predefined Bluetooth proximity range;

a push notification module configured to send a push notification from the enterprise mobile device to the non-enterprise mobile device to initiate a digital assisted shopping session;

a secure local handshake module configured to establish a secure local handshake between the mobile banking application on the non-enterprise mobile device and the enterprise application on the enterprise mobile device by exchanging encryption keys and performing mutual authentication;

a local wireless encrypted communication module configured to establish a local wireless encrypted communication channel between the mobile banking application and the enterprise application using the encryption keys;

a Customer Relationship Management (CRM) integration module configured to retrieve a customer profile and existing financial accounts, products, and services from a CRM system to the enterprise application;

an artificial intelligence (AI) and machine learning (ML) module configured to analyze the customer profile, transaction history, and financial goals to identify suitable financial accounts, products, and services for the customer;

a secure screen sharing module configured to securely share a screen from the enterprise application to the mobile banking application to provide information regarding available financial accounts, products, and services;

an enhanced verification module configured to perform enhanced verifications if the financial accounts, products, and services require additional security;

a secure cloud communication module configured to facilitate communication over a secure cloud connection between the enterprise application and a central banking system to facilitate enrollment in the financial accounts, the products, and the services;

a geolocation monitoring module configured to continuously monitor the geolocation of both the enterprise mobile device and the non-enterprise mobile device to confirm proximity and verify that the DAS representative and the customer are not in a prohibited or dangerous location;

a background biometric verification module configured to perform periodic background biometric verification of both the customer and the DAS representative during the session without disturbing them; and a session termination module configured to terminate the session if any security breaches, failed verifications, or prohibited locations are detected during the session.

11. The system of claim 10, wherein the mobile banking application further comprises:

a biometric data capture module configured to capture biometric data using the mobile banking application's embedded security microservices; and a biometric data comparison module configured to compare the captured biometric data to pre-stored biometric data for the customer to confirm customer identity.

12. The system of claim 11, wherein the enterprise application further comprises:

a biometric data capture module configured to capture biometric data using the enterprise application's biometric identity verification capabilities; and a biometric data comparison module configured to compare the captured biometric data to pre-stored biometric data for the DAS representative to confirm representative identity.

13. The system of claim 12, wherein the Bluetooth proximity detection module is configured to:

utilize Bluetooth Low Energy (BLE) technology to detect when the non-enterprise mobile device and the enterprise mobile device are within the predefined proximity range; and establish an initial connection based on the detected proximity.

14. The system of claim 13, wherein the secure local handshake module is configured to:

use asymmetric encryption to exchange public keys between the non-enterprise mobile device and the enterprise mobile device;

generate a shared session key using a Diffie-Hellman key exchange protocol; and perform mutual authentication using digital certificates or pre-shared keys.

15. The system of claim 14, wherein the local wireless encrypted communication module is configured to:

use Transport Layer Security (TLS) or Secure Socket Layer (SSL) protocols to encrypt data transmitted between the mobile banking application and the enterprise application; and utilize Wi-Fi Direct or Near Field Communication (NFC) for direct device-to-device connections.

16. The system of claim 15, wherein the enhanced verification module is configured to:

require additional biometric checks for high-value transactions; and implement multi-factor authentication (MFA) using one-time passwords (OTPs) or security questions for critical actions.

17. The system of claim 16, wherein the geolocation monitoring module is configured to:

use GPS, Wi-Fi, and cellular data to track the locations of the enterprise mobile device and the non-enterprise mobile device; and send real-time alerts if the devices move out of a required proximity range or enter a prohibited area.

18. The system of claim 17, wherein the background biometric verification module is configured to:

integrate non-intrusive biometric checks seamlessly into the mobile banking application's operation to verify authorized user identity without disturbing the session; and terminate the session if any discrepancies or failed verifications are detected during the session.

19. The system of claim 18, wherein the secure screen sharing module is configured to:

securely share the DAS representative's screen with the customer's mobile banking application to provide detailed information about available financial products and services; and ensure that sensitive financial information is only visible to an intended recipient during the screen sharing session.

20. An information security method for secure authentication and communication between a Digital Assisted Shopping (DAS) representative using an enterprise mobile device and a customer using a non-enterprise mobile device, the method comprising the steps of:

performing biometric identity verification on the non-enterprise mobile device of the customer, wherein the biometric identity verification includes capturing biometric data using the mobile banking application and comparing the captured biometric data to pre-stored biometric data for the customer;

performing biometric identity verification on the enterprise mobile device of the DAS representative, wherein the biometric identity verification includes capturing biometric data using an enterprise application and comparing the captured biometric data to pre-stored biometric data for the DAS representative;

automatically detecting proximity of the non-enterprise mobile device and the enterprise mobile device using Bluetooth Low Energy (BLE) technology, wherein proximity is detected when the devices are within a predefined proximity range;

initiating a secure session between the non-enterprise mobile device and the enterprise mobile device upon detecting the proximity, wherein the initiation includes sending a push notification from the enterprise mobile device to the non-enterprise mobile device to initiate a digital assisted shopping session and receiving an acknowledgment of the push notification from the non-enterprise mobile device;

establishing a secure communication channel between the non-enterprise mobile device and the enterprise mobile device, wherein the secure communication channel is established by performing a secure local handshake that includes exchanging encryption keys using asymmetric encryption, generating a shared session key using a Diffie-Hellman key exchange protocol, and performing mutual authentication using digital certificates or pre-shared keys;

exchanging data related to customer profiles, financial accounts, products, and services between the non-enterprise mobile device and the enterprise mobile device through the secure communication channel, wherein the data exchange includes retrieving customer profiles and financial account information from a Customer Relationship Management (CRM) system to the enterprise application, sending push notifications to the mobile banking application for profile review and updates, and utilizing artificial intelligence (AI) or machine learning (ML) algorithms to analyze the customer profile, transaction history, and financial goals to identify suitable financial accounts, products, and services for the customer;

continuously monitoring geolocation of both the enterprise mobile device and the non-enterprise mobile device to ensure proximity and safety, wherein the geolocation monitoring uses GPS, Wi-Fi, and cellular data to track locations of the devices and sends real-time alerts if the devices move out of a required proximity range or enter a prohibited area;

performing periodic biometric re-verifications of both the customer and the DAS representative during the session, wherein the biometric re-verifications are performed in a background without user disruption and are integrated seamlessly into the mobile banking application's and enterprise application's operation;

proposing financial accounts, products, and services to the customer through a digital assistant shopping process, wherein the process includes:

analyzing the customer's profile, transaction history, and financial goals using AI or ML algorithms;

generating a list of recommended financial accounts, products, and services based on the analysis;

securely sharing the generated list with the customer via the mobile banking application;

allowing the customer to review and select desired financial accounts, products, and services through the mobile banking application;

providing detailed information and options for each recommended financial account, product, and service through secure screen sharing from the enterprise application to the mobile banking application;

facilitating customer selections by enabling secure, real-time enrollment and transaction processing through the secure communication channel; and terminating the session if any security breaches or anomalies are detected, wherein session termination includes logging an event and alerting both the customer and the DAS representative of the termination and a reason for it.

* * * * *